(12) United States Patent
Hieke et al.

(10) Patent No.: US 10,533,767 B2
(45) Date of Patent: *Jan. 14, 2020

(54) METHODS OF REDUCING CONSUMPTION OF ENERGY AND OTHER RESOURCES ASSOCIATED WITH OPERATING BUILDINGS

(71) Applicants: Andreas Hieke, San Mateo, CA (US); William Boone Daniels, II, Marikina (PH)

(72) Inventors: Andreas Hieke, San Mateo, CA (US); William Boone Daniels, II, Marikina (PH)

( * ) Notice: Subject to any disclaimer, the term of this patent is extended or adjusted under 35 U.S.C. 154(b) by 124 days.

This patent is subject to a terminal disclaimer.

(21) Appl. No.: 15/449,704

(22) Filed: Mar. 3, 2017

(65) Prior Publication Data
US 2018/0252427 A1 Sep. 6, 2018

(51) Int. Cl.
*F24F 11/74* (2018.01)
*G05B 19/048* (2006.01)
(Continued)

(52) U.S. Cl.
CPC ............. *F24F 11/74* (2018.01); *F24F 11/30* (2018.01); *F24F 11/62* (2018.01); *F24F 11/63* (2018.01);
(Continued)

(58) Field of Classification Search
CPC ........ F24F 5/0089; F24F 5/0092; F24F 11/30; F24F 11/58; F24F 11/62; F24F 11/63;
(Continued)

(56) References Cited

U.S. PATENT DOCUMENTS

| 3,897,820 A | 8/1975 | Teeter |
| 3,948,314 A | 4/1976 | Creswick et al. |

(Continued)

FOREIGN PATENT DOCUMENTS

WO   WO 2017/002295   1/2017

OTHER PUBLICATIONS

Berdahl et al., "Three-year weathering tests on asphalt shingles: Solar reflectance", Solar Energy Materials & Solar Cells (2012) 99: 277-281.
(Continued)

*Primary Examiner* — Crystal J Barnes-Bullock
(74) *Attorney, Agent, or Firm* — Knobbe, Martens, Olson & Bear, LLP

(57) ABSTRACT

The invention concerns predominantly enclosed spaces, typically buildings, which are at least exposed to directionally and temporally varying levels of solar electromagnetic radiation as well as temporally varying levels of ambient air temperature and ambient air flow velocity and direction.

Methods for at least approximating any one or any combination of system targets of a) reducing the average energy expenditure for keeping at least one primary compartment of a building within a desired temperature range by means of active air conditioning, or b) reducing temperature variations during a typical 24-hour cycle within said at least one primary compartment of said building, or c) reducing one or both of the average temperature or the peak temperature of said at least one primary compartment of said building. Methods for at least partially increasing the typical lifetime of some components of buildings and thus reducing resources associated with maintaining at least some buildings function.

33 Claims, 9 Drawing Sheets

(51) Int. Cl.

| | | |
|---|---|---|
| *F24F 11/30* | (2018.01) | |
| *F24F 11/62* | (2018.01) | |
| *G05B 15/02* | (2006.01) | |
| *F24F 11/63* | (2018.01) | |
| *F24F 11/70* | (2018.01) | |
| *G06Q 10/04* | (2012.01) | |
| *G06Q 50/06* | (2012.01) | |
| *E04B 1/76* | (2006.01) | |
| *F24F 11/56* | (2018.01) | |
| *F24F 110/12* | (2018.01) | |
| *F24F 11/64* | (2018.01) | |
| *F24F 130/10* | (2018.01) | |
| *F24F 110/10* | (2018.01) | |
| *F24F 11/46* | (2018.01) | |
| *F24F 11/65* | (2018.01) | |
| *F24F 140/60* | (2018.01) | |
| *F24F 130/20* | (2018.01) | |
| *F24F 130/00* | (2018.01) | |
| *E04B 1/74* | (2006.01) | |
| *F24F 11/58* | (2018.01) | |

(52) U.S. Cl.
CPC .............. *F24F 11/70* (2018.01); *G05B 15/02* (2013.01); *G05B 19/048* (2013.01); *G06Q 10/04* (2013.01); *G06Q 50/06* (2013.01); *E04B 1/74* (2013.01); *E04B 1/76* (2013.01); *F24F 11/46* (2018.01); *F24F 11/56* (2018.01); *F24F 11/58* (2018.01); *F24F 11/64* (2018.01); *F24F 11/65* (2018.01); *F24F 2110/10* (2018.01); *F24F 2110/12* (2018.01); *F24F 2130/00* (2018.01); *F24F 2130/10* (2018.01); *F24F 2130/20* (2018.01); *F24F 2140/60* (2018.01); *G05B 2219/2614* (2013.01); *G05B 2219/42155* (2013.01)

(58) Field of Classification Search
CPC ........ F24F 11/70; F24F 11/77; F24F 2110/10; F24F 2110/12; F24F 2110/20; F24F 2130/00; F24F 2130/10; F24F 2140/60; F24F 2221/18; F24F 11/74; F24S 20/61; F24S 50/40; F24D 19/109; F28F 27/00; G05B 19/048; G05B 2219/2614; G05B 15/02; G01K 17/20; G01N 25/20; G06Q 10/04; G06Q 50/06
See application file for complete search history.

(56) References Cited

U.S. PATENT DOCUMENTS

| | | | |
|---|---|---|---|
| 4,212,289 A | 7/1980 | Hebert | |
| 4,235,048 A | 11/1980 | Gillery | |
| 4,249,340 A | 2/1981 | Maes, Jr. | |
| 4,290,416 A | 9/1981 | Maloney | |
| 4,337,754 A | 7/1982 | Conger | |
| 4,408,596 A | 10/1983 | Worf | |
| 4,596,093 A | 6/1986 | Esposito | |
| 5,314,027 A | 5/1994 | Wood | |
| 5,675,487 A | 10/1997 | Patterson et al. | |
| 6,220,339 B1 | 4/2001 | Krecke | |
| 6,632,516 B2 | 10/2003 | Aanestad | |
| 6,786,056 B2* | 9/2004 | Bash .................. | F25B 5/02 62/199 |
| 7,434,577 B2 | 10/2008 | Doherty | |
| 7,610,910 B2 | 11/2009 | Ahmed | |
| 8,007,898 B2 | 8/2011 | Bailey et al. | |
| 8,248,256 B1 | 8/2012 | Gerardi et al. | |
| 8,289,160 B1 | 10/2012 | Billman | |
| 8,689,490 B2 | 4/2014 | Sumner | |
| 9,303,930 B2* | 4/2016 | Ishizaka ............ | F28F 27/00 |
| 9,639,072 B2* | 5/2017 | Burke ................. | G05B 15/02 |
| 10,280,626 B2 | 5/2019 | Hieke et al. | |
| 2007/0019199 A1 | 1/2007 | Palmer et al. | |
| 2007/0199562 A1* | 8/2007 | Doherty ............. | F24S 10/502 126/647 |
| 2008/0000151 A1 | 1/2008 | Houweling et al. | |
| 2008/0014857 A1* | 1/2008 | Spadafora .......... | F24F 3/16 454/229 |
| 2008/0241262 A1 | 10/2008 | Lee et al. | |
| 2009/0013596 A1 | 1/2009 | Wang | |
| 2010/0170497 A1 | 7/2010 | Glynn | |
| 2011/0111147 A1 | 5/2011 | Agrawal et al. | |
| 2011/0223850 A1* | 9/2011 | Narayanamurthy | F24F 3/14 454/239 |
| 2012/0072032 A1* | 3/2012 | Powell ............... | F24F 11/30 700/278 |
| 2012/0079833 A1 | 4/2012 | Rowe | |
| 2012/0087085 A1 | 4/2012 | Moore et al. | |
| 2012/0325126 A1 | 12/2012 | Tran et al. | |
| 2013/0192131 A1 | 8/2013 | Abahusayn | |
| 2013/0193005 A1 | 8/2013 | Hoeth | |
| 2013/0199772 A1* | 8/2013 | Fischer .............. | F28F 27/00 165/287 |
| 2013/0340969 A1 | 12/2013 | Vollen et al. | |
| 2014/0277765 A1* | 9/2014 | Karimi .............. | G05B 15/02 700/276 |
| 2014/0339316 A1* | 11/2014 | Barooah ............. | G06Q 50/06 236/49.3 |
| 2015/0237812 A1* | 8/2015 | Gupta ................ | A01G 9/14 47/17 |
| 2015/0253401 A1 | 9/2015 | Rapoport | |
| 2015/0330923 A1* | 11/2015 | Smullin ............. | G01N 25/20 702/136 |
| 2016/0053481 A1 | 2/2016 | Hieke et al. | |
| 2016/0261116 A1* | 9/2016 | Barooah ............. | G06Q 50/06 |
| 2016/0320073 A1 | 11/2016 | Hieke et al. | |
| 2016/0320080 A1 | 11/2016 | Hieke et al. | |
| 2017/0059187 A1* | 3/2017 | Smith, Jr. ........... | F24D 19/109 |
| 2017/0192442 A1 | 7/2017 | Hieke et al. | |
| 2017/0205105 A1* | 7/2017 | Adam ................ | F24F 11/30 |
| 2017/0211829 A1* | 7/2017 | Slack ................. | F24D 12/00 |
| 2018/0252423 A1 | 9/2018 | Hieke et al. | |
| 2018/0252424 A1 | 9/2018 | Hieke et al. | |
| 2018/0252426 A1* | 9/2018 | Hieke ................ | F24F 11/30 |

OTHER PUBLICATIONS

Chung W., "Review of Building Energy-use Performance Benchmarking Methodologies", Appl Energy (2011) 88: 1470-1479.

European Union/Parliament, Directive on Energy Efficiency of the Council on Oct. 25, 2012; amending Directives 2009/125/EC and 2010/30/EU and repealing Directives 2004/8/EC and 2006/32/EC; printed in the Official Journal of the EU on Nov. 14, 2012; 65 pages.

Goswami et al., [Eds.] Energy Management and Conservation Handbook, CRC Press, Taylor & Francis Group, (2007); ISBN 978-4200-4429-4; TOC, 16 Pages.

Haynes W.M. [Ed.], CRC Handbook of Chemistry and Physics, 93rd Edition CRC Press (2012), Taylor & Francis Group, ISBN 978-1-439-8049-4; TOC, 9 pages.

Horvath H., "Gustav Mie and the scattering and absorption of light by particles: Historic developments and basics", J Quantit Spectros Radiative Transfer (2009) 110: 787-799.

International Energy Agency. Key World Energy Statistics. OECD/IEA (2012); Free Publications; 34 pages.

Joos G. [Ed.] Theoretical Physics 3rd Edition; Dover Publications Inc., New York, (1986), ISBN 0-486-65227-0; TOC, 19 pages.

Kreith F. [Ed.] The CRC Handbook of Thermal Engineering; Boca Raton: CRC Press LLC, (2000); 1183 pages.

Mie G., "Contributions to the optics of diffuse media, specifically colloidal metallic suspensions", Annalen der Physik, 4th series, vol. 25 (1908) No. 3, pp. 377-445.

National Renewable Energy Laboratory (NREL), http://www.nrel.gov; Home Page; downloaded Aug. 18, 2015; 3 pages.

National Solar Radiation Resource Data Products, http://www.nrel.gov/rrede/ downloaded Jun. 16, 2016; 2 pages.

(56) References Cited

OTHER PUBLICATIONS

Santamouris M., "Cooling the cities—A review of reflective and green roof mitigation technologies to fight heat island and improve comfort in urban environments", Solar Energy (2014) 103: 682-703.
Shi Z. et al., "Analyzing the effect of the longwave emissivity and solar reflectance of building envelopes on energy-saving in buildings in various climates", Solar Energy (2011) 85: 28-37.
UNEP Sustainable Buildings & Climate Initiative, "Buildings and Climate Change", Summary for Decision-Makers; (2009); 61 pages.
International Search Report and Written Opinion dated Jun. 9, 2017 for Application No. PCT/US2017/20764, filed Mar. 3, 2017.
Wikipedia—"Mie Scattering"; downloaded Jul. 19, 2018 in 9 pages.
Wikipedia—"Rayleigh Scattering"; downloaded Jul. 19, 2018 in 6 pages.

* cited by examiner a)

b)

a)

b)

METHODS OF REDUCING CONSUMPTION OF ENERGY AND OTHER RESOURCES ASSOCIATED WITH OPERATING BUILDINGS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

One of the primary needs for the disclosed invention stems from the desire to reduce energy consumption of buildings, which is a major contributor to global energy consumptions and thus indirectly to $CO_2$ emissions.

The world's energy demand and consumption is rapidly growing, in particular in developing countries. The finite amount of ultimately recoverable fossil fuels (primarily coal, oil, gas), but more importantly the associated environmental pollutions and $CO_2$ emissions—unsustainable at current rates,—as well as expected future price increases of energy from fossil resources make global energy supply one of the biggest challenge man kind faces.

Currently, the resources used for heating or cooling of buildings constitutes a major part of the total global energy (40%) and water (25%) consumption. Buildings are the source of nearly one third of the greenhouse gas emission. Further details on this topic can be found, for example, at UNEP. Sustainable buildings & climate initiative, building and climate change, United Nations Environment Program (2009), the entirety of which is incorporated herein by reference. During the period of 1973-2010, the $CO_2$ emission was doubled (from 15.637 to 30,326 million tons $CO_2$)

Further details on this topic can be found, for example, at International Energy Agency. Key world energy statistics. OECD/IEA (2012). http://www.iea.org/publications/free-publications/publication/kwes.pdf, the entirety of which is incorporated herein by reference. Therefore, buildings provide a substantial potential for reducing $CO_2$ emission (and operating expenses) at relatively low cost, which is a concern primarily in developed counties such as the USA or Europe. Simultaneously, advances in building materials, designs and system operations related to energy consumption, if implemented on a large enough scale in developing countries, can be a major contributor to at least slow down the currently occurring and often environmentally unacceptable (e.g. China) or even technically unsustainable (e.g. India) rate of required energy supply, in particular of electric energy, resulting from an constantly increasing standard of living for large portions of said populations.

The International Energy Agency (IEA) has published data on energy consumption trends. While the total primary energy supply (TPES) was doubled from 1973 to 2010 (from 6107 to 12,717 million tons of oil equivalent, MTOE) and crude oil production increased almost 40% (from 2869 to 4011 million tons), the total final energy consumption showed 31% increase (from 2815 to 3691 MTOE).

The European Union's Energy Efficiency Directive (passed on 25 Oct. 2012) recognizes that ' . . . the rate of building renovation needs to be increased, as the existing building stock represents the single biggest potential sector for energy savings. Moreover, buildings are crucial to achieving the Union's objective of reducing greenhouse gas emissions by 80-95% by 2050 compared to 1990'. Further details on this topic can be found, for example, at Directive 2012/27/EU of the European Parliament and of the Council of 25 Oct. 2012 on energy efficiency, amending Directives 2009/125/EC and 2010/30/EU and repealing Directives 2004/8/EC and 2006/32/EC http://eur-lex.europa.eu/LexUriServ/LexUriServ.do?uri=OJ:L:2012:315:0001:0056:EN:PDF, the entirety of which is incorporated herein by reference.

A related problematic aspect is the relative cost of energy. In most of the equatorial regions, where developing countries are predominantly located, the price for electricity compared to the average income is too high to permit 24/7 active air conditioning (AC) of most residential or office building. Therefore, any material, design, or systems control improvements to buildings, which will noticeably lower indoor temperatures and/or reduce required energy consumption of air conditioning, especially during dry seasons—i.e., during high solar radiation input, will considerably contribute to well-being and efficiency of its occupants.

Henceforth the term 'supplied energy' shall be understood to refer to the energy delivered or supplied to a building (or similar space) on purpose, typically produced elsewhere, and typically in form of electrical energy (regardless how it was generated, including but not limited to being derived from chemical energy (typically fossil fuels), nuclear energy, mechanical kinetic energy (wind, water), or electromagnetic (EM) wave energy in form of optical and/or IR solar irradiance, but explicitly also including electricity generated in photo-voltaic cells mounted at least partially on the surface and/or in the vicinity of said building). In some instances said supplied energy may at least in part be delivered to a building in form of chemical energy, in such cases typically as fossil fuels, but also e.g. in form of previously generated hydrogen or other generated chemicals, and the electricity required to operate said air conditioning system is generated from said supplied chemical energy inside said building.

Thus, the term 'supplied energy' shall serve to distinguish it from sources and types of energy involved in the discussed problem, namely from solar energy in from of electromagnetic irradiance arriving at a building, thermal energy of the ambient air, thermal energy stored in the structure of said building, it's components or dedicated energy storage systems, as well as in the air contained in said building etc.

Thus one of the primary need for the disclosed invention stems more specifically from the desire to reduce the amount of supplied energy required to keep certain portions of buildings within certain temperature ranges.

On of the secondary benefits of the disclosed invention is that in some embodiments it helps to reduce the consumption of other resources, namely building materials and labor. By at least approximating certain physical and/or chemical target values within at least portion of said predominantly enclosed space, in some embodiments on average more favorable conditions in terms of average temperature, humidity, and air throughput (volume per time) can be achieved, which result in a higher lifetime of at least some components from which said predominantly enclosed space is built. For example, in some such embodiments the lifetime of components made from wood or other organic materials can be increased, and thus the time between repairs increased or the need for repairs entirely eliminated.

One of the tertiary benefits of the disclosed invention is that it provides means to supersede antiquated and unscientific building codes concerning air flow in buildings, which are not based or derived from optimization or at least approximation of specific physical target values.

Description of the Related Art

As explained in more technical detail further down, the thermal behavior of a building is a classic example of a highly complex multiphysics—problem, i.e. various physical effects determine—in a coupled manner—the energy budget (and thus temperature) as well as airflow inside and within the direct vicinity of a building. Specifically, actively driven and/or permitted or suppressed passive air flow within a building has a considerable effect on the energy budget of a building. However, air flow in (at least parts of) buildings is typically not a primary design point, at least not with respect to resulting impact on the thermal budget of buildings, and if considered at all overly simplifying approximations are frequently used, i.e. it is not considered a fluid dynamic and aerodynamic problem.

Thus, there is a need for innovation to address aspects of air flow in at least parts of a building specifically targeted at reducing the average supplied energy expenditure for any one or any combination of a) keeping at least one primary compartment of a building within a desired temperature range by means of active air conditioning or heating, or b) reducing temperature variations during a typical 24-hour cycle within said at least one primary compartment of said building, or c) reducing one or both of the average temperature or the peak temperature of said at least one primary compartment of said building.

Secondly, throughout the most parts of the world, regulations and rules have been established, which govern certain technical aspects building constructions, commonly referred to as building standards or building codes. Clearly, the primary purpose is to ensure safety of occupants. Furthermore, such codes also govern requirements directly or indirectly related to energy consumption, including but not limited to insulation, wall thicknesses, ventilation etc. In addition, some such codes concern requirements related to esthetic aspects, i.e. the visual appearance of buildings.

It is noteworthy that within the United States of America, building codes and standards adopted in numerous US states can all be traced back to a set of publications developed by at least one non-government for-profit organization. Further details on this topic can be found, for example, at "A Guide to California Housing Construction Codes", State of California, 2014 Department of Housing and Community Development, Division of Codes and Standards; "2013 California Building Code", California Code of Regulations, Title 24, Part 2, Volume 1, California Building Standards Commission, Sacramento, Calif. 95833-2936, ISBN: 978-1-60983-457-9; "2013 California Building Code", California Code of Regulations, Title 24, Part 2, Volume 2, California Building Standards Commission, Sacramento, Calif. 95833-2936, ISBN: 978-1-60983-457-9; "2013 California Residential Code", California Code of Regulations, Title 24, Part 2.5, California Building Standards Commission, Sacramento, Calif. 95833-2936, ISBN: 978-1-60983-458-6; and Douglas W. Thornburg, John R. Henry: "2012 International Building Code Handbook" McGraw-Hill Education, LLC, New York 2012, ISBN 978-0-07-180131-7, the entirety of which are incorporated herein by reference.

While some aspects of these standards and codes are obviously independent of geographic location—and thus climatic conditions—certain other aspects do considerably depend on typical environmental and climatic conditions (temperatures, solar input, humidity, wind etc.) and thus these environmental aspects should be considered for establishing meaningful and effective guidelines and codes for a given geographic region. Yet this critical process of adjusting said standards and codes has thus far not or only insufficiently occurred with respect to some specific technical aspect. (In future, a better way how standards should be defined is to make the definition independent of said environmental and climatic conditions by not specifying specific shapes or sized, but by specifying specific desirable results.)

One specific such aspect expressed in these standards and codes relates to ventilation, and more specifically one peculiar subsections concerns the concept of a "net free vent area", which will henceforth be discussed in more detail.

For example, in the 2013 California Building Code, California Code of Regulations, Title 24, Part 2, Volume 1, California Building Standards Commission, the following formulation can be found: "Enclosed attics and enclosed rafter spaces formed where ceilings are applied directly to the underside of roof framing members shall have cross ventilation for each separate space by ventilation openings protected against the entrance of rain and snow. Blocking and bridging shall be arranged so as not to interfere with the movement of air. An airspace of not less than . . . 25 mm shall be provided between the insulation and the roof sheathing. The net free ventilating area shall not be less than $\frac{1}{150}$th of the area of the space ventilated".

And furthermore: "Exterior openings into the attic space of any building intended for human occupancy shall be protected to prevent the entry of birds, squirrels, rodents, snakes and other similar creatures. Openings for ventilation having a least dimension of not less than . . . 1.6 mm and not more than . . . 6.4 mm shall be permitted. Openings for ventilation having a least dimension larger than . . . 6.4 mm shall be provided with corrosion-resistant wire cloth screening, hardware cloth, perforated vinyl or similar material with openings having a least dimension of not less than . . . 1.6 mm) and not more than . . . 6.4 mm."

Comparable statements are made about under-floor ventilation. "Openings for under-floor ventilation: The net area of ventilation openings shall not be less than . . . 0.67 $m^2$ for each 100 $m^2$ of crawl-space area. Ventilation openings shall be covered for their height and width with any of the following materials, provided that the least dimension of the covering shall be not greater than . . . 6 mm."

Thus, the seemingly magic ratio of 1:150 appears again. (In a few instances that ratio is inexplicably changed to 1:300, but the associated fundamental problem remains.) This concept of a fixed "net free vent area" (more accurately it should be call "vent area ratio") is questionable in terms of its technical utility based on at least 3 major arguments:

1.) It Lacks Fundamental Technical or Scientific Rationale.

In order to be meaningful, any recommendations or standards expressed in respect to required ventilation, or more accurately required air flow, an actual physical (or chemical) objective has to be defined, which by implementation of said requirements one attempts to at least approximate. Ideally, specific minimal or maximal target values of specific physical or chemical quantities should be given. However, before mentioned concept of a "net free vent area" fails address any fundamental physical objective. One may image, for example, that a possible target might be to maintain (or at least not to exceed) a certain level of humidity, a certain level of temperature, a certain amount of replaced air volume within a certain time frame, a certain air flow velocity, etc. all of which is entirely impossible to ensure in a consistent manner for variably shaped buildings under hugely varying climatic conditions only with said trivial definition of a "net free vent area".

2.) It Illustrated Fundamental Lack of Understanding Fluid Dynamics and Aerodynamic Phenomena.

The manner in which requirements are expressed in the 2013 California Building Code are effectively non-physical. First of all, based on the given definition, the term "net free ventilating area" is a misnomer, since it is the ratio of two areas, i.e. a dimensionless quantity and—if used at all—should e.g. better be referred to as "ventilation area ratio". Another ambiguity arises from the term "area of the space ventilated". It is not clear if this refers to the horizontal floor area of the "space ventilated" or to the area of the roof (ceiling) above said space (i.e., if it is indeed supposed to be a "ventilation inlet area to floor area ratio" or a "ventilation inlet area to roof area ratio")

Secondly, either way, what is required is simply to surpass a certain ratio (1:150) of two areas, presumably the sum of the area openings for ventilation divided by presumably floor area. It is physically entirely impossible to make any meaningful predictions about the resulting air flow speed, spatial distribution, and throughput volume (i.e., a three-dimensional vector field) in an arbitrarily shaped attic with arbitrarily shaped and located openings solely based on such a single ratio. It is physically impossible that such a single simplistic rule can ensure any specific physical target for different buildings and under varying conditions. Without specifying at least the shape of the building (including the attic, including any sub-spaces and divisions), thus also its volume, the number of openings, their cross section of all ventilation openings, their shape, and size, the location where the openings are placed, any (typically occurring) external air flow, the spatial orientation of the building with respect to such typical external air flow, and furthermore any knowledge of thermally induces flows (i.e. temperature profiles resulting in buoyancy and thus convection) the actually occurring throughput of air can easily differ several orders of magnitude, thus rendering the requirements such as those expressed in the California Building Code, or other references, such as the 2012 International Building Code Handbook (Thornburg) physically and technically meaningless.

Such hugely simplified specification completely ignore the considerable physical complexity of the underlying phenomena, in particular related the fluid dynamics and thermal effects. More comments regarding the difficulties of air flow predictions based (at least) on the governing Navier-Stokes equations (a system of nonlinear second order differential equations of vector and scalar fields in three dimensions) will be given further down.

3.) It Suffers from Lack of Consideration of Geographic and Thus Meteorological Variations.

Literally the same requirements to fulfill the "net free vent area" standards are being stated for California, District of Columbia, Puerto Rico, New York (state), and Washington (state), to name a few. The corresponding phrases have been verbatim copied from [8], likely without any further technical review, which in some instances leads to incongruous requirements. For example, all standards, including the ones for Florida and Puerto Rico, specify that "ventilation openings shall be protected against rain and snow". We believe that there is not a single event in recorded human history of naturally occurring snow in Puerto Rico.

Thus, there is also a need for innovation to address aspects of air flow in buildings in a technically meaningful manner, which also provides an opportunity to achieve savings of various resources, namely in some instances energy and/or materials, at least for certain building designs and under certain climatic conditions.

SUMMARY OF THE INVENTION

For purposes of summarizing the invention and the advantages achieved over the prior art, certain objects and advantages of the invention have been described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The disclosed invention enables, among other applications, any one or any combination of
  a) reducing the average supplied energy expenditure for keeping at least one primary compartment of a building, typically comprising at least one room, within a desired temperature range by means of active air conditioning (or, although less typical, in some instances heating), or
  b) reducing temperature variations during a typical 24-hour cycle (or multiples thereof) within said at least primary compartment of said building, or
  c) reducing one or both of the average temperature or the peak temperature of said at least one primary compartment of said building.

Furthermore, by reducing the supplied energy consumption also the operating expenditure is reduced.

Obviously, such methods can not only be beneficially applied in equatorial, tropical, and subtropical regions, but also e.g. in areas like the southwest of the Unites States, or central and southern parts of Europe during time of relatively high solar input.

The disclosed invention is at least in part based on a more comprehensive understanding and consideration of the underlying coupled physical effects, which describe the thermal and aerodynamic behavior (including energy budget) of buildings, and incorporating analytical, and/or numerical, and/or reduced order models thereof into advanced control strategies, typically embodied in suitable electronic controllers, which can drive at least one adjustable element, henceforth referred to as actuator (as more comprehensively defined below) installed in or on said building, which has directly or indirectly impact on said energy budget and/or air flow and/or other related physical quantities including but not limited to a) temperature or temperature variations, b) humidity or humidity variations, c) chemical composition of air, i.e. oxygen levels (furthermore including level of any organic or inorganic contamination), in at least parts of said building, and at least during certain time periods enabling also reductions of supplied energy (typically electrical energy) required to maintain desired levels of such before mentioned physical and/or chemical quantities.

Thus, in the most general sense the disclosed invention serves in some embodiments to at least approximate a system target of
  reducing the average expenditure of at least one resource within one both of
    at least one primary compartment of a building or
    at least one secondary compartment of a building, and said building being at least partially exposed to directionally and temporally varying levels of solar electromagnetic radiation as well as temporally varying levels of air temperature, said building comprising at least one primary compartment and at least one secondary compartment, wherein said primary compartment predominantly serves to achieve the primary purpose of the building, and wherein direct flow of air into and out of said primary compartment is predominantly relatively restricted, and wherein air can one or both of actively or passively be exchanged between said secondary compartment and the outside of said building, furthermore comprising at least one electronic control system, and said at least one control system being in communication with at least one sensor to provide electronic signals representing solar radiation levels, at least one sensor to provide electronic signals representing ambient air temperature levels, at least one sensor to provide electronic signals representing air temperature in said at least one secondary compartment, and said control system being able to one or any combination of controlling means to modulate the throughput of passive air flow to and from said at least secondary compartment, controlling means to modulate the average speed of passive air flow to and from said at least secondary compartment, controlling means to modulate the throughput of actively driven air flow to and from said at least secondary compartment, controlling means to modulate the average speed of actively driven air flow to and from said at least secondary compartment, said control system further comprising at least one, at least partially descriptive, reduced order model or simplified discretized numerical model of the thermal behavior of said building, and said control system using said at least one reduced order model or simplified discretized numerical model to derive control signals suitable at least approximate said at least one system target, and said control system having at least one data interface to accept input of at least desired system target values or types.

For example, an additional benefit of the disclosed invention is that in some embodiments it may also or exclusively serve to reduce the consumption of resources such as building materials and labor. By at least approximating certain physical and/or chemical target values within at least portion of said predominantly enclosed space, in some embodiments on average more favorable conditions in terms of average temperature, humidity, and air (volume) throughput can be achieved, which result in a higher lifetime of at least some components from which said predominantly enclosed space is built. For example, in some such embodiments the lifetime of components made from wood can be increased, and thus the time between repairs increased or the need for repairs entirely eliminated.

Yet another benefit of the disclosed invention is that it can provide means to supersede illogical building standards concerning air flow in buildings, which are not based or derived from optimization or at least approximation of specific physical target quantities and values.

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Figure 1:
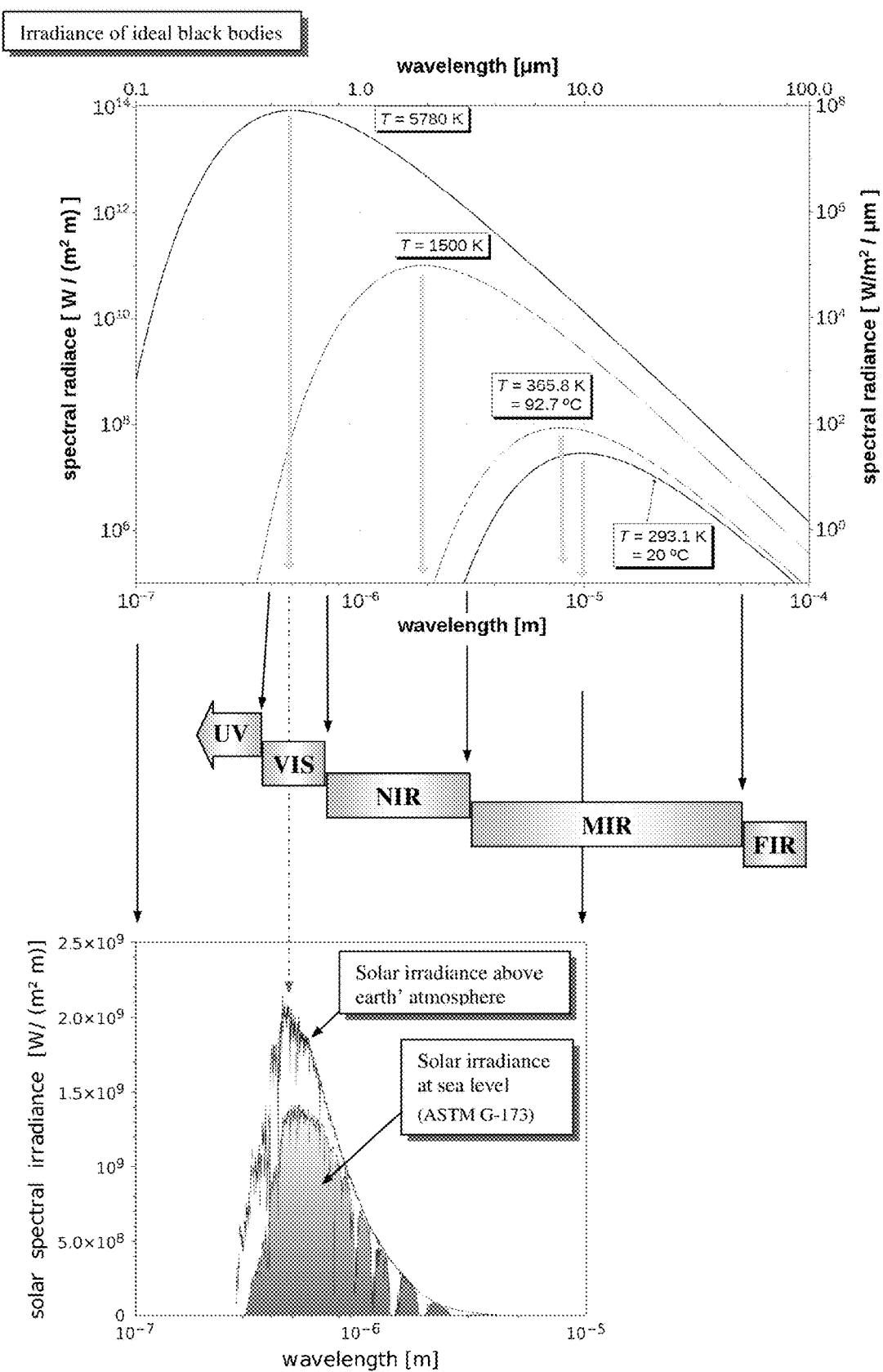
FIG. 1 illustrates the spectral distribution of the spectral radiative flux, i.e., spectral radiance, an ideal black body emits as a function of wavelength, for four different temperatures.

FIG. 1 illustrates the spectral distribution of the spectral radiative flux, i.e., spectral radiance, an ideal black body emits as a function of wavelength, for four different temperatures, according to Planck's law. Also shown is the conceptual division of this part of the electromagnetic spectrum in ultra-violet (UV), visible (VIS), Near Infrared (NIR), Mid Infrared (MIR), and Far Infrared (FIR).

By integrating Planck's law over all wavelengths Stefan-Boltzmann's law can be derived, which makes more apparent the (highly non-linear) correlation between the temperature and the total radiated. i.e. emitted power density (per area), i.e. radiative flux or irradiance, of an ideal black body.

The lower the temperature of an object is, the more is the spectral distribution of the emitted radiance shifted towards larger wavelength. The value of the wavelength where the spectral radiance has its maximum shall be denoted $\lambda_{max}$. For example, at T=5780 K, the temperature of the surface of the sun, $\lambda_{max} \approx 0.5$ µm and the integrated spectral radiance reaches 63 MW/m². By integrating the spectral irradiance over the corresponding wavelength ranges (and assuming ideal unfiltered black-body radiation) one can derive that at this temperature of a radiating object, about 10% of the emitted radiation (i.e. emitted power) is within the UV, 39% is visible to humans, 49% is within the NIR range, and only about 2% within the MIR range.

To give another example, at T=1500 K the highest spectral irradiance is at $\lambda_{max} \approx 1.93$ µm. Already at this temperature (and of course lower ones) most of the emitted radiation is invisible to humans. In this particular example of T=1500

K, the amount of spectral irradiance at the upper wavelength limit visible to humans of about $\lambda=0.7$ µm, relative to the maximum irradiance at $\lambda_{max} \approx 1.93$ µm is only about 2.5%. Again, integrated over the corresponding wavelength ranges one derives that about 0.05% of the emitted radiation is visible to humans, 56% is within the NIR range, and 44% within the MIR range.

At T=365.8 K=92.7° C. the integrated spectral radiance has dropped to 1 kW/m² and the highest spectral irradiance is at $\lambda_{max} \approx 8$ µm. There is no radiation visible to humans, 0.08% of the emitted radiation is within the NIR range, and 98% within the MIR range.

At a typical room temperature of T=293.1 K=20° C. the maximum of the spectral radiance is at $\lambda_{max}=9.9$ µm. Here, about 97% the emitted radiation is within the MIR range, and 2.8% range within the FIR range.

This illustrates that (a) higher temperatures of an object, corresponding to shorter wavelength, nonlinearly higher power is radiatively transferred and that (b) the visual color and appearance of an object can be considerably different from its thermal radiative behavior.

At the bottom of FIG. 1 is a plot given, which shows the actual solar irradiance at the average distance between sun and earth, i.e. the irradiance outside earth' atmosphere, as well as the typical maximal irradiance at see level. This plot is based on the reference solar spectral irradiance ASTM G-173 [5]. As illustrated, most of the solar irradiance is contained in the wavelength range between 0.25 µm and 3.0 µm. Integrated over the entire spectral range, the irradiance, which arrives from the sun at the average distance between the sun and the earth (i.e., at the outer edge of the atmosphere) is approximately 1.36 kW/m². Determined by the chemical composition and density of the air and furthermore influenced by humidity (incl. clouds), dust, pollution levels, latitude, time of day, date, etc., the solar irradiance is attenuated while passing through the atmosphere and the spectrum is filtered (some bands are suppressed). Under best-case conditions, the peak levels of the irradiance at sea level is about 900 W/m².

The solar irradiance, which arrives at sea level after passing through earth' atmosphere, now comprises only about <4% within the UV range, about 45% within the VIS range, and 51% in the NIR range (more precisely between 750 nm and 2.5 µm). These ratios are good approximates. More precise values depend on numerous other parameters.

These plots also illustrate that solar radiation can in first order still be approximated as black body radiation.

As an additional reference it shall be commented, that in the southwest of the United States, at ground level, the average energy density per day on a horizontal plate is about 5 to 6 kWh/m²/day on a horizontal plate (e.g. a horizontal surface of a building) and >9 kWh/m²/day on a surface, which is 2-axis tracking to remain normal to the incidence (Source: National Solar Radiation Data Base).

Said solar irradiance is one of the sources of thermal gains of a building, which needs to be considered for the subsequently described computation and prediction of the thermal budget of a building. Furthermore, buildings can lower their thermal budget by emitting radiation in the MIR range, if external conditions permit (i.e. toward a clear night sky).

A second source of thermal gains or losses of a building is due to convection as a result of contact with an external flow field of air.

Figure 2:
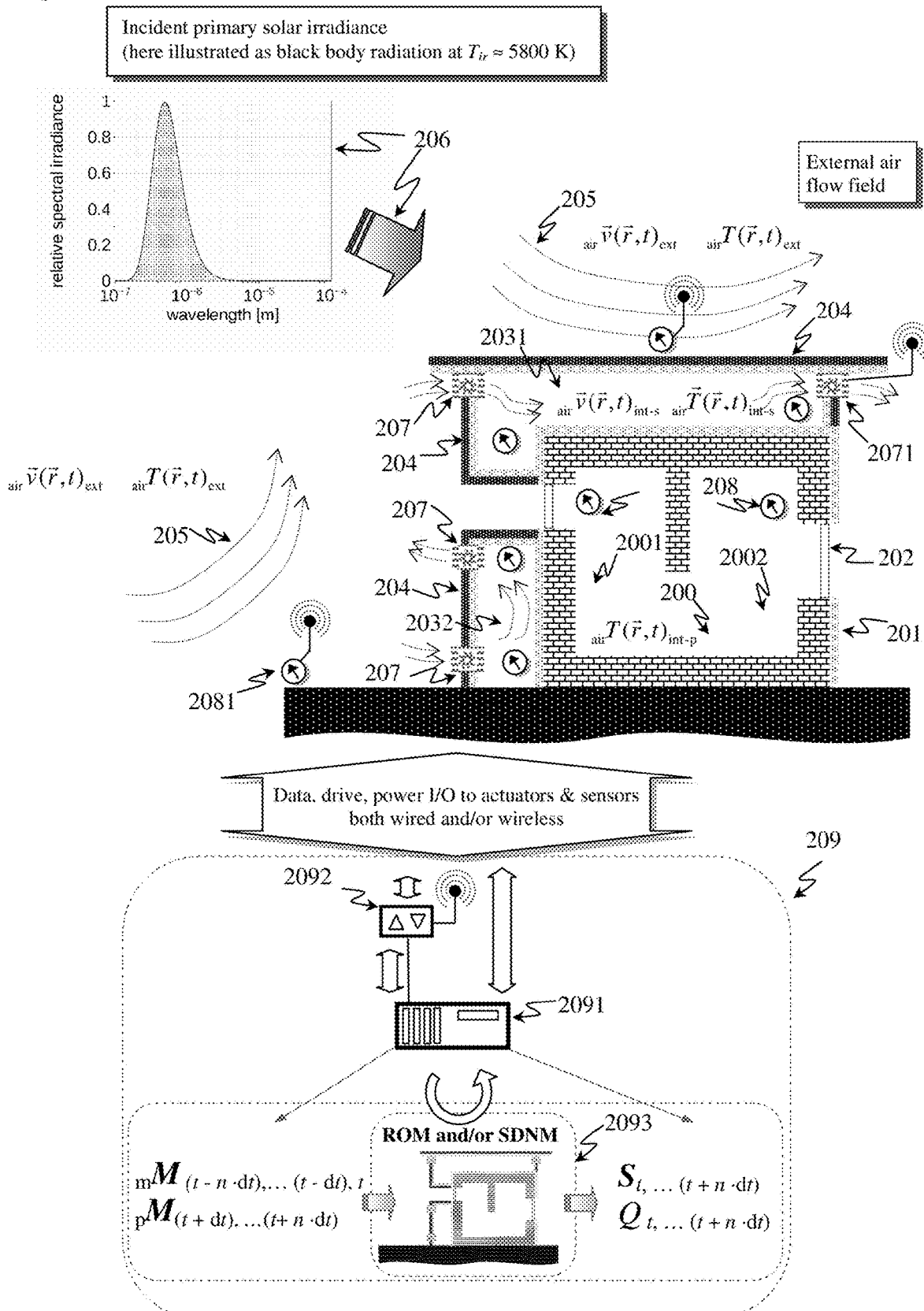
FIG. 2 schematically illustrates a cross section of a building comprising an internal space.

FIG. 2 illustrates highly schematically and not to scale a cross section of a building comprising an internal space 200, which is divided into primary compartments 2001 and 2002 and wherein said primary compartments predominantly serve to achieve the primary purpose of the building such as for example living space for humans or animals, office space, equipment space (e.g. computers incl. server farms etc. or other machinery), or storage spaces. Furthermore denoted is the air temperature field $_{air}T(r, t)_{int-p}$, (bold letters representing vectors), present in said primary compartments. The internal space is predominantly defined by walls 201, which may also comprise windows, doors, and other openings, schematically represented as 202. The direct flow of air into and out of said primary compartments is predominantly relatively restricted. There is also at least one secondary compartment, here illustrated as secondary compartment 2031 and 2032, at least partially defined by walls 204 as well as walls 201. It shall be noted that the subsequently disclosed inventions is not dependent on the choice of materials used for said walls, although this has of course impact on the heat capacity of the building (and thus thermal energy stored in the structure), thermal conductivity, and time constants.

The building is exposed to a temporally and spatially varying external air flow field 205 with the air velocity vector field denoted as $_{air}v(r, t)_{ext}$ and air temperature scalar field denoted $_{air}T(r, t)_{ext}$. The dotted arrows used to indicate the air flow field (both inside and outside said building) are only meant to illustrate the air flow in principle, but are not to be understood to represent representations of actual computational fluid dynamics (CFD) simulations or measurements.

Furthermore, the building is exposed to directionally and temporally varying levels of solar electromagnetic radiation (or irradiance) 206, roughly resembling atmospherically filtered black body radiation of approximately 5600 K, as discussed above.

Said at least on secondary compartment comprises at least one, but typically a plurality of typically electrically controlled actuators 207, which can any one or any combination of modulate the amount of passive air flow to and/or from said at least one secondary compartment, and/or actively drive air flow to and/or from said at least one secondary compartment at a controllable rate, and/or or modulate the amount of otherwise actively driven air flow to and/or from said at least one secondary compartment.

Thus, in the context of this invention the term "actuator" 207 shall be understood to define at least one class of devices, which can achieve said functions, including but not limited to a any one or any combination of typically electrically driven and/or controlled: variable valves, shutters, gates, choke point, or other variable restrictions; propelled fans of any shape and/or any other moving configuration (e.g. also including but not limited to axial fans, centrifugal fans, impellors, blowers, other pumps, and also including those, which are predominantly not rotating e.g. incl. bellows, paddles, etc.) or any arrangement suitable to affect, drive, or suppress air flow at a variable rate and/or direction. Variable shall mean to have at least two states (such as on and off, or full on and ½ on, inward or outward, etc.), i.e. a pulse-width modulated control scheme shall explicitly be included, but in many embodiments said actuators 207 will be able to assume a plurality of discrete states, typically dictated by the bit width of the underlying control circuitry (e.g. 4 bit, 8 bit, 10 bit, 12 bit, etc. . . . ) and/or design of stepper motors etc.), or in some instances said actuator may be able to be controlled in an analog mode.

Furthermore distributed throughout the inside of said building, and/or in or on its walls, and/or on the outside of said building, and/or in its immediate vicinity is a plurality of sensors 208, which provide electronic representation (readout) of any one or any combination of physical quantities:

air temperature,
air flow speed, and/or mass flow rate
air flow directions (i.e., vector information)
air pressure
air humidity
electromagnetic spectral information in the IR and/or VIS range,
either as 0-, 1-, or 2-dimensional sensor,
resulting from any one or any combination of solar radiation, reflection of solar radiation from the environment, or being emitted from walls of said building.

(In some instances also indirectly derived turbulence data, e.g. Reynolds numbers may be included, i.e., considered input from "sensors".)

Said sensors 208 provide sensor data to an "electronic control system", henceforth also referred to as "control system" or "electronic controller" 209. In typical embodiments said control system comprises at least one processing unit 2091, which may further comprise a plurality of analog and/or digital I/O boards, some of which send signals to and/or receive signals from, and/or provide power to said plurality of sensors 208, and some of said I/O boards send signals to and/or receive signals from, and/or provide power to and/or otherwise drive said actuators 207, thus for example affecting the air flow speed and/or air throughput. (The terms "performance of said control system" and "control system performance" are henceforth considered to be synonymous.)

For digital signals this may in some embodiments comprise standards such as RS232, RS485, RS422, GPIB, LonWorks, SCADA, CAN, CANopen, Profibus, SafetyBUS, INTERBUS, SERCOS, Sinec H1, Ethernet, EtherCAT, LXI (LAN eXtensions for Instrumentation) and all other Ethernet based communications systems or other types of networks and field buses, some of which are listed further down.

In some embodiments some signal lines from/to said plurality of analog and/or digital I/O boards may be directly connected to said a plurality of sensors 208, and actuators 207, while some other signals may have to undergo amplification, filtering, conversion, or other processing in additional electronic components 2092. This may in some embodiments comprise, power amplifiers, driver motors, incl. for stepper motors, signal modulators/demodulators etc.

In some embodiment the communication between said at least one electronic controller 209, including said additional electronic components 2092, and at least some of sensors 2081 and/or actuators 2071 are at least in part based on wireless transmissions, including various wireless standards and/or protocols, in particular any type of medium or higher rate wireless personal area network, which in many instances may already be present in many buildings, including but not limited to those based all variants of IEEE 802.11 ("Wi-Fi"), IEEE 802.16m ("WiMAX"), and/or any other TCP/IP (IPv4 and/or IPv6) based local wireless networks, and/or any derived versions thereof, or other future comparable standards and/or protocols.

The processing unit 2091 may be based on any one or any combination of suitable computational architecture, incl. for example x86, x86-64, ARM, etc., incl. also any embedded systems, furthermore any so called "system on a chip" (SoC) e.g. Snapdragon, and may in some embodiments at least partially also comprise FPGAs and/or PLCs. The chassis and/or bus structure of said processing unit 2091 may in some embodiments be based on PCI, PXI, PXIe.

In some embodiments said at least one electronic controller 209 is also executing an at least one algorithm, either entirely in software and/or at least partially in hardware (e.g. in FPGAs), which at least in part serves to at least approximate any one or any combination of system targets of reducing the average energy expenditure for keeping at least one primary compartment of a building within a desired temperature range by means of active air conditioning,
or
reducing temperature variations during a typical 24-hour cycle
within said at least one primary compartment of said building,
or
reducing one or both of the average temperature or the peak temperature
of said at least one primary compartment of said building.

Said at least one algorithm executed by said controller 209 at least in part comprises an at least partially descriptive, reduced order model (ROM) and/or simplified discrete numerical model (SDNM) 2093 of the thermal behavior of said building, which in some embodiments at least enables to at least approximately compute the thermal budget of said building (i.e., in particular the stored thermal energy) as well as spatial air and wall temperature distribution.

As input values to said at least one model serve at least the measured sensory data $_mM_t$ acquired at time t. Thus $_mM_t$ can be thought of as a long vector comprising all quantities acquired by all sensors (including the scalar components of any acquired 3D vectors, such as flow directions or directional information of incident solar irradiance), although in some cases said algorithm may not use all of them. In some embodiments at least some sensor date $_mM_{(t-n \cdot dt), \ldots (t-dt)}$, which were previously acquired at one or a certain number n of time steps dt may be used as additional data input vectors. In some embodiments at least some sensor date $_pM_{(t+dt), \ldots (t+n \cdot dt)}$, which are predicted to occur at one or a certain number n of future time steps dt may be used as additional data input vectors. This may in many cases concern predicted environmental conditions such as predicted external air flow speed and air temperature as well as incident solar irradiance and direction thereof. In some embodiments such data may be obtained from external data sources such as weather forecasting entities, and in many embodiments such data is transmitted to said controller 209 via the internet. In some embodiments said controller 209 may also execute at least rudimentary predictive calculations itself, specifically concerning solar directional information.

Said reduced order model (ROM) and/or simplified discrete numerical model (SDNM) enables in particular to calculate at least in part and at least approximately what shall henceforth be referred to as the thermal system state $S_t$ (or thermal budget) of said building at a given time t as well as at one or a certain number n of future time steps dt. Said state $S_t$ shall at least comprise temperatures of components of the building (e.g. walls) at various points, air temperature at various points at least inside said primary compartments. In addition, said ROM/SDNM model provides at least approximate values for the total stored thermal energy $Q_t$ (primarily as result of its thermal mass, i.e. spatial distribution of heat capacity), and in some embodiments also in a spatially resolved manner, i.e. how the thermal energy is spatially distributed in the structure $Q_t(r)$.

Furthermore, said model is thus able to predict the temperature response as a result of removed or gained thermal energy, in particular as a result of any one and any combination of a) environmental conditions at least comprising
external airflow and the resulting convective thermal gains or losses,
radiative gains from solar irradiance and radiative losses if the surfaces of said building can emit toward colder surroundings (e.g. the night sky),
b) induced air flow (outside and/or inside said building) as a result of thermal gradients (both as a result of radiative gains or other internal sources) and resulting redistribution of energy as well as resulting thermal gains or losses,
c) by means of said actuators 207 modulated passive air flow or actively driven air flow inside said building, in particular modulated air flow in said secondary compartments, as well as
d) actively powered (by "supplied energy" as defined above) internal sources or sinks of energy such as air conditioning systems, heaters etc., as well as unintentional sources of energy input (e.g. cooking ovens).

Thus said algorithm uses said ROM/SDNM to evaluate a plurality of scenarios of possible control strategies ahead of time in order to find at least one or several which reduces, in some cases minimizes, consumption of supplied energy (as defined above), i.e. electrical energy spent for active air condition systems, in particular by being able to make predictions how air flow into and/or out of and/or within said secondary compartments influences the thermal budget of said building and affects the temperature in at least one of said primary compartments.

Fundamentally, the ability to achieve at least in some cases and during certain times and conditions any such reduction of supplied energy consumptions is the result of the fact that said modulation of air flow by actuators 207 will typically require less energy to achieve a certain control target (e.g. a temperature in said at least one primary compartment) compared to exclusively using actively powered air systems, but provided that the employed ROM/SDNM is of sufficient fidelity, i.e. predictive value.

Thus said at least one controller 209 uses said at least one ROM/SDNM to derive control signals suitable at least approximate said at least one system target by repeatedly running and comparing the effectiveness of various such strategies.

Figure 3:
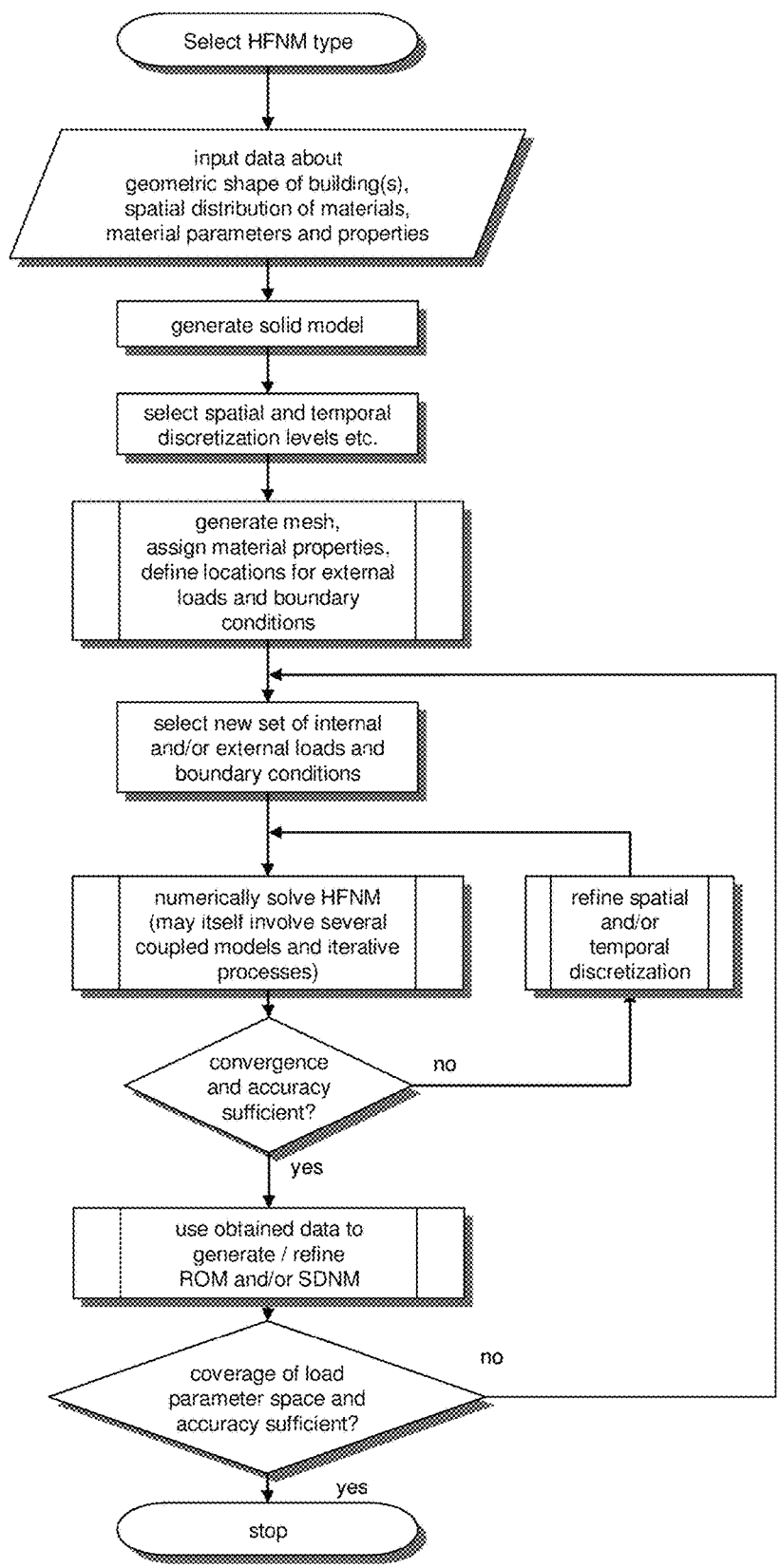
FIG. 3 schematically illustrates how ROM/SDNM is derived from a relatively high-fidelity numerical multi-physics model of the thermal behavior of a building.

FIG. 3 illustrates highly schematically how said ROM/SDNM is derived from what will henceforth be referred to as a (relatively) high-fidelity numerical multi-physics model (HFNM) of the thermal behavior of said building.

The thermal behavior or the thermal budget of predominantly enclosed spaces, such as buildings or similar habitats, is a classic example of a highly complex multi-physics-problem, i.e., a problem where numerous different physical effects or phenomena play a role in a coupled manner, i.e., simply put, in general the results of (any) one effect will have impact on the degree to which (any) another effect plays a role. As such, related (coupled) to the energy budget of a building are the temperature distribution in the structure of said building, as well as air flow (speed, direction), temperature and humidity inside and within the direct vicinity of said building.

As explained in more detail further below, in order to describe said thermal behavior, time-dependent solutions to very large systems of coupled differential equations are required. However, it is effectively impossible to find any direct analytical solution for these equations for any realistic 3D geometry (finite size, no or weak symmetry). Therefore, an accurate ("high-fidelity") analysis (prediction) of the thermal behavior of a building must be based on numerical models and numerical solution methods to solve the underlying coupled differential equations of a discretized model of at least one given building and its interaction with the environment, i.e., at least in some cases at least part of the environment may be part of the discretized model.

The more, typically coupled, physical effects are incorporated into a mathematical model, and the better (more accurately) material constants (or functions) are known, the more precisely the model can predict the thermal behavior of the described building. Such models consist, at least conceptually, out of a potentially large set of coupled differential equations and non-differential equations.

Creating such discretized models and obtaining the corresponding solutions is difficult and computationally highly demanding, but possible. In particular, typically any one or any combination of the following numerical methods is used to generate said HFNM: Finite Element Method (FEM), Finite Difference Method (FDM), Finite Volume Method (FVM), Finite Difference Time Domain (FDTD). Monte Carlo Method, Boundary Element Method (BEM), including any sub-variant of any of the above, often also in combination with iterative methods, including but not limited to successive approximations. Some such methods are mesh-based (e.g. FEM), others are not (e.g. BEM).

The optimal choice of the particular numerical method or combinations thereof depends on the specific case and on the desired level of fidelity.

As input data for the HFNM will typically be required at least the 3d spatial geometry of the building (i.e., shape of all structural and other elements)
thus also providing the enclosed air volumes,
the 3d spatial distribution of heat capacity of materials which constitute a building
(enabeling also to compute the total heat capacity of a building materials)
the 3d spatial distribution of thermal conductance (of bulk material, including windows)
in a building
the 3d spatial distribution of specific spectral electromagnetic properties
(typically UV to FIR reflectivity) of bulk materials and surfaces in a building
the 3d spatial distribution of spectral electromagnetic properties transmission of any
windows (i.e., transmittance/reflectance as function of wavelength)
if present, the spatial distribution of phase change materials within a building and the corresponding phase transition enthalpies
if present, location, size, and parameters of other energy sources or sinks (e.g. AC)
if present, location, size, and parameters of actively driven air.

As a next step typically at least one solid model is generated numerically describing the spatial arrangements of all components considered in the HFNM.

As a next step spatial and temporal discretization levels are chosen for the subsequent numerical computations. In many embodiments choosing spatial discretization will for example imply defining the element size (in case of FEM) at various locations within the model, which needs to be known in the subsequent step involving meshing said solid model. In some embodiments choosing temporal discretization will for example imply defining the time step size to be used when computing time dependent phenomena.

The degree of spatial and temporal discretization has considerable impact on the accuracy of the computed result (or if a result can be obtained at all). In general, the finer the discretization, the higher the accuracy of the result, but also the higher the computational effort. This is in particular a consideration for 3d models, where doubling linear spatial resolution results approximately 8-timers higher number of the resulting degrees of freedom on case of FEM models. To provide a very crude example, if a hypothetical building where to be approximated as a $(10\ m)^3$ cube and the uniform spatial resolution would be 10 cm, solving for a single scalar degree of freedom on each node point (e.g. only temperature for a heat conductance problem) would result in approximately $100^3=10^6$ nodes (assuming linear elements), i.e. about 1 million unknowns (typically represented as at least 4 byte single precision, but typically 8 byte double precision variables) to be obtained as solution from a sparse system of equations. However, 10 cm discretization is relatively course compared to the typical features of a house (e.g. compared to wall thickness.) If the spatial discretization were to be refined to 1 cm, the result would be approximately $10^9$ node points, i.e., approximately 1 billion unknowns. Moreover, a realistic multiphysics simulation will simultaneously solve for several physical quantities at a single node point (assuming the same mesh is used), for example, air flow speed vectors, air pressure, etc.

This illustrates the importance of skillful creation of the HFNM (balancing computational effort with accuracy. It furthermore demonstrates as essential for the disclosed invention the need to use computationally orders of magnitude less expensive ROMs/SDNMs in said control system 209, which typically has orders of magnitude less computational power than typical high-end workstations or even compute clusters used to solve the underlying HFNM.

However, the consistently increasing performance of computational hardware (e.g. the availability of workstations with 32 processor cores and 128 Gbyte main memory as of 2017) has now moved it in the realm of practical possibilities to obtain solutions to such HFNM with acceptable financial effort (i.e., without using super computers).

As illustrated in FIG. 3, as a next step a set of boundary and initial conditions is chosen for the subsequent computation. While some of the data required to generate the ROM/SDNM can be obtained with a single solution of said HFNM (e.g. computation of total heat capacity), others will require several solution under changing boundary and initial conditions, for example changing directions external air flow fields as well as changing directions of solar irradiance.

The solution data obtained in the step above are now being used to generate and refine said ROM/SDNM. The process of obtaining solutions to the HFNM is in some embodiments repeated in an iterative manner until the ROM/SDNM reaches an acceptable level of accuracy compared to the HFNM. It is helpful during this step to know the location of said sensors 208 and 2081 as well as said actuators 207 and 2071 and type of input data, since ultimately these data are the once which the ROM/SDNM will be given during future practical application to derive its control strategy from. Conversely, said iterative process can also serve to find desirable locations for said sensors and/or actuators. In other words, the measured sensory data $_mM_t$, which form the input data for said ROM/SDNM, can be considered to cover relatively high-dimensional (parameter) space, and for each specific vector $_mM_t$ represents a specific state of internal and external conditions within this space, and for which the ROM/SDNM must at least be able to provide the thermal system state $S_t$ (or thermal budget) of said building (and the total stored thermal energy $Q_t$) within a certain error margin.

As mentioned, said state $S_t$ shall at least comprise temperatures of components of the building (e.g. walls) at various points, and air temperatures at various points at least inside said primary compartments.

Figure 4:
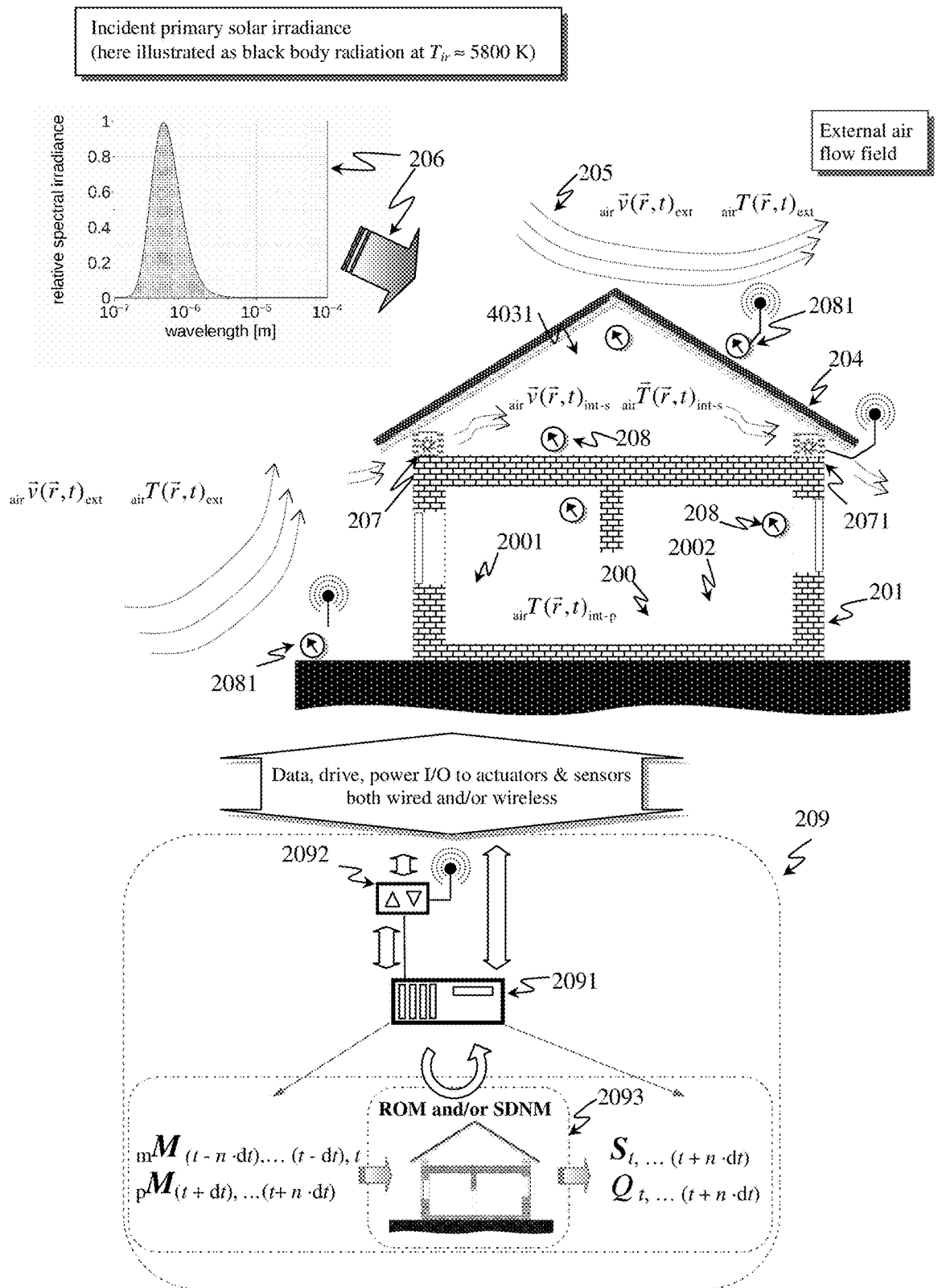
FIG. 4 schematically illustrates an embodiment of a building comparable to FIG. 2, with a different cross section.

FIG. 4 is comparable to FIG. 1 and illustrates highly schematically and not to scale an embodiment of the disclosed invention on a building with a different cross section, here a type of gable roof (regardless of actual pitch), forming a secondary compartment 4031, here predominantly an attic space, and actuators 207 in proximity to the eaves. Again, distributed throughout the inside of said building, and/or in or on its walls, and/or on the outside of said building, and/or in its immediate vicinity is a plurality of sensors 208, including in some versions of this embodiment sensor 2081 with wireless data communication.

Figure 5:
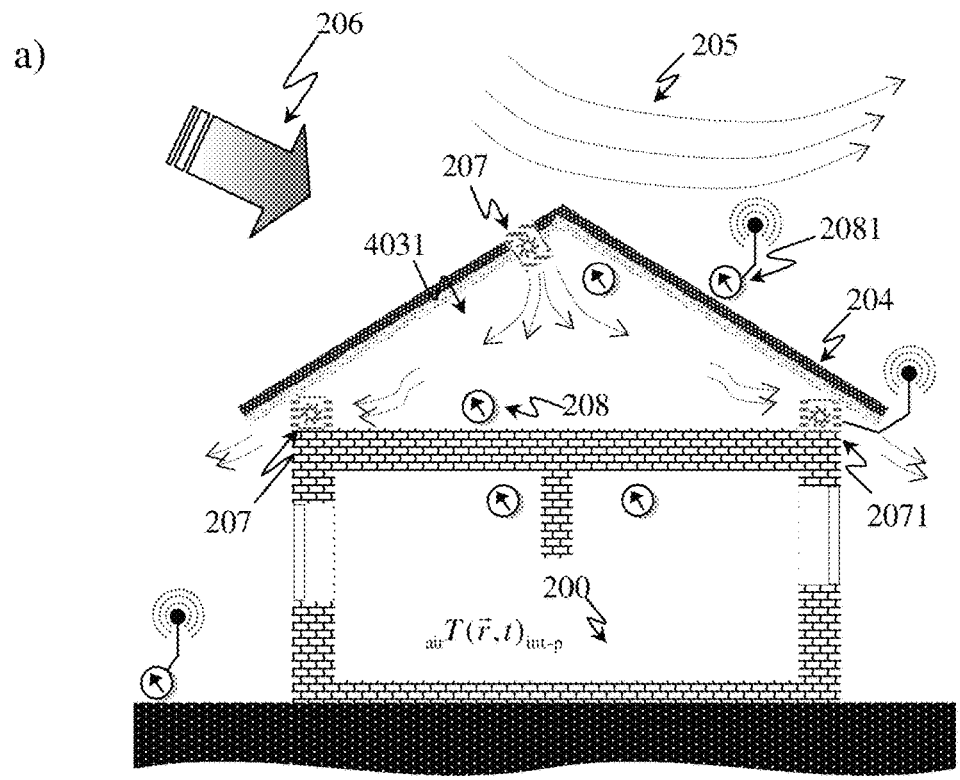
FIGS. 5a and 5b schematically illustrate two different airflows in a building with a similar cross section as FIG. 4 with at least one actuator in proximity to the ridge of the roof.
Figure 5:
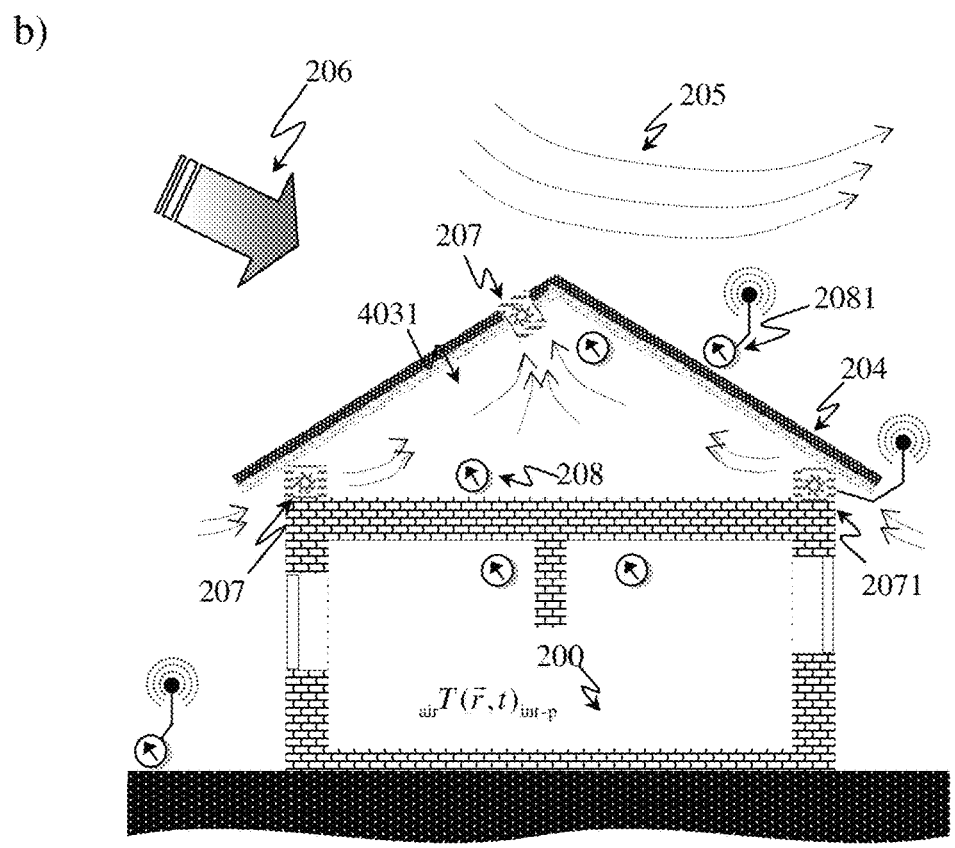

FIG. 5 is comparable to FIG. 4 and illustrates highly schematically and not to scale a similar embodiment of the disclosed invention of a building with a similar cross section as in FIG. 4, here a type of gable roof (regardless of actual pitch), with at least one, but typically a plurality of actuators 207 in proximity to the ridge of the roof. Again, distributed throughout the inside of said building, and/or in or on its walls, and/or on the outside of said building, and/or in its immediate vicinity is a plurality of sensors 208, including in some versions of this embodiment sensor 2081 with wireless data communication. Said electronic controller 209 has been omitted in this figure.

FIG. 5a (top) illustrates one mode of operation, whereby the airflow in said secondary compartment 4031, here predominantly an attic space, is predominantly from the ridge of the roof towards the eaves. FIG. 5b (bottom) illustrates one mode of operation, whereby the airflow in said secondary compartment 4031 is reversed, i.e., predominantly from the eaves of the roof towards the ridge.

Figure 6:
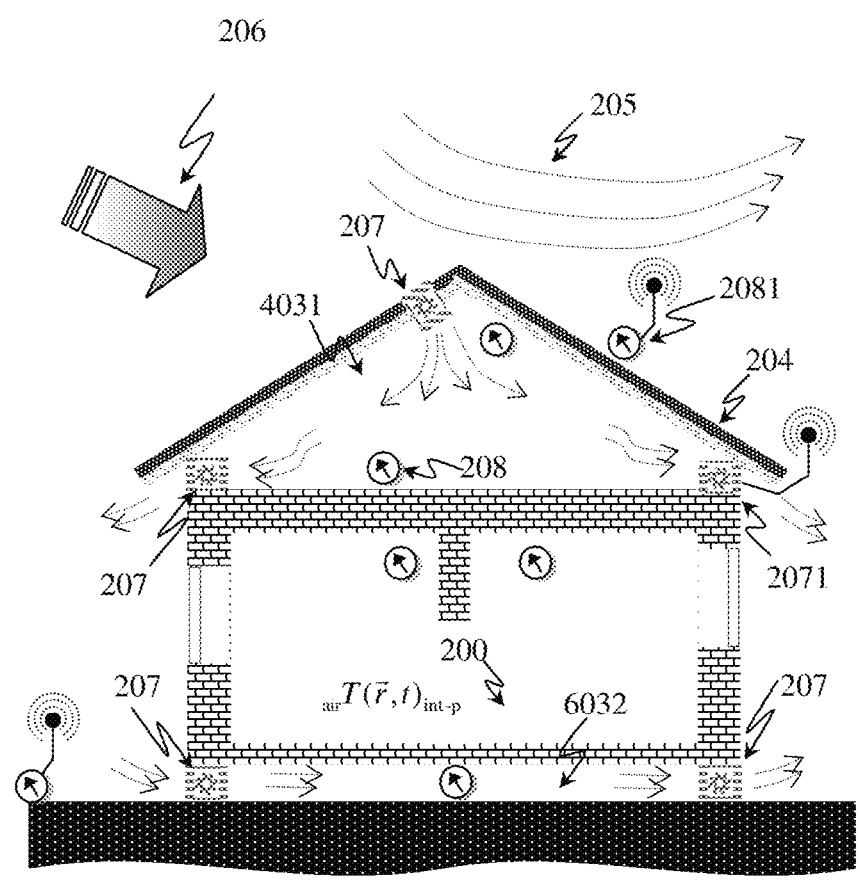
FIG. 6 schematically illustrates a building with a similar cross section as in FIGS. 5a and 5b, but with an additional secondary compartment.

FIG. 6 is comparable to FIG. 5 and illustrates highly schematically and not to scale an a similar embodiment of the disclosed invention of a building with a similar cross section as in FIG. 5, here a type of gable roof (regardless of actual pitch). In addition to secondary compartment 4031 in this embodiment there is an additional secondary compartment 6032 predominantly between the primary compartment 200 and the ground. One particular mode of airflow within said secondary compartment 6032 is schematically illustrated.

Again, distributed throughout the inside of said building, and/or in or on its walls, and/or on the outside of said building, and/or in its immediate vicinity is a plurality of sensors 208, including in some versions of this embodiment sensor 2081 with wireless data communication. Again, said electronic controller 209 has been omitted in this figure.

The illustration is highly schematic, and in particular the proportions between the sensors 208 and the secondary compartments are exaggerated. It is not meant to imply that the sensors restrict the air flow in said secondary compartments.

Figure 7:
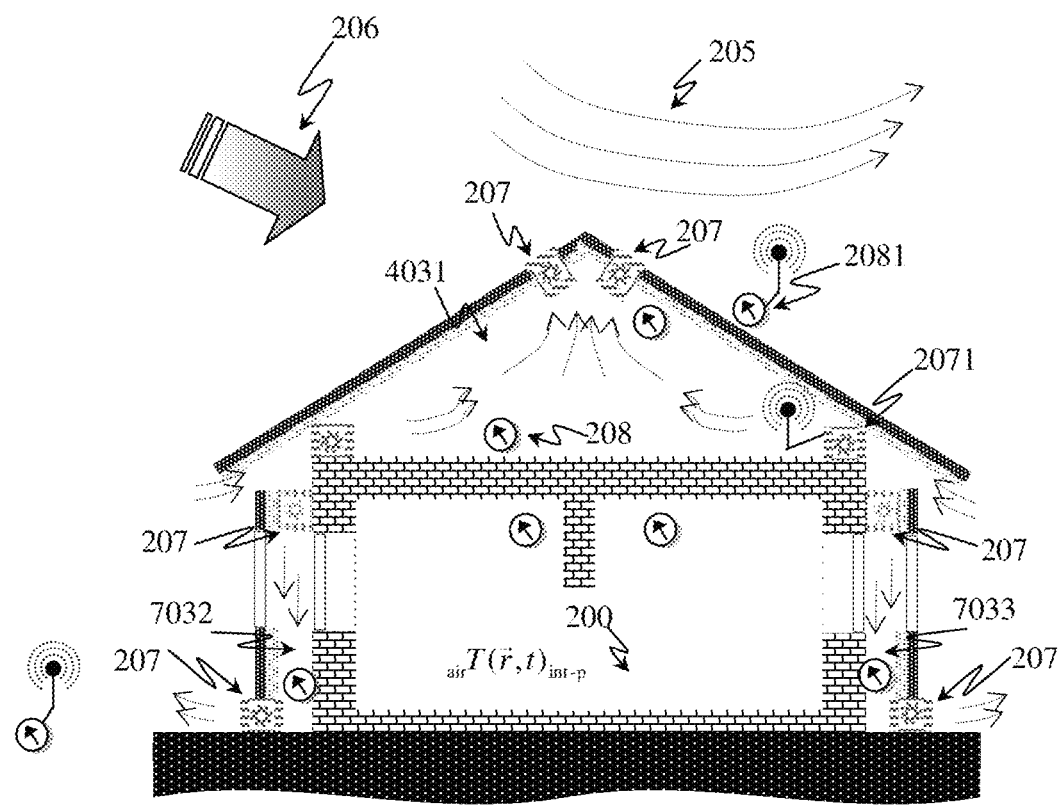
FIG. 7 schematically illustrates a building with a similar cross section as in FIGS. 5a and 5b, but with two additional secondary compartments predominantly alongside the side walls of the building.

FIG. 7 is comparable to FIG. 5 and illustrates highly schematically and not to scale an embodiment of the disclosed invention of a building with a similar cross section as in FIG. 5, here a type of gable roof (regardless of actual pitch). In addition to secondary compartment 4031 in this embodiment there are two additional secondary compartments 7032 and 7033, predominantly alongside the side walls of the building, effectively encasing a large portion of the primary compartment 200. In some such embodiments said secondary compartments 7032 and 7033 may effectively be created by at least partially hollow walls.

One particular mode of airflow within said secondary compartments is schematically illustrated. Clearly, depending on the direction in which said actuators 207 and 2071 permit or drive air flow, various combinations are possible, in which direction air flow through the individual secondary compartments can predominantly occur (resulting, among other physical effects, in differences in thermal gain or loss), which is precisely what said electronic controller 209 will determine based on said ROM/SDNM in order to achieve at least one specific control target. Again, said electronic controller 209 has been omitted in this figure.

The illustration is highly schematic, and in particular the proportions between the sensors 208 and the secondary compartments are exaggerated. It is not meant to imply that the sensors restrict the air flow in said secondary compartments.

Figure 8:
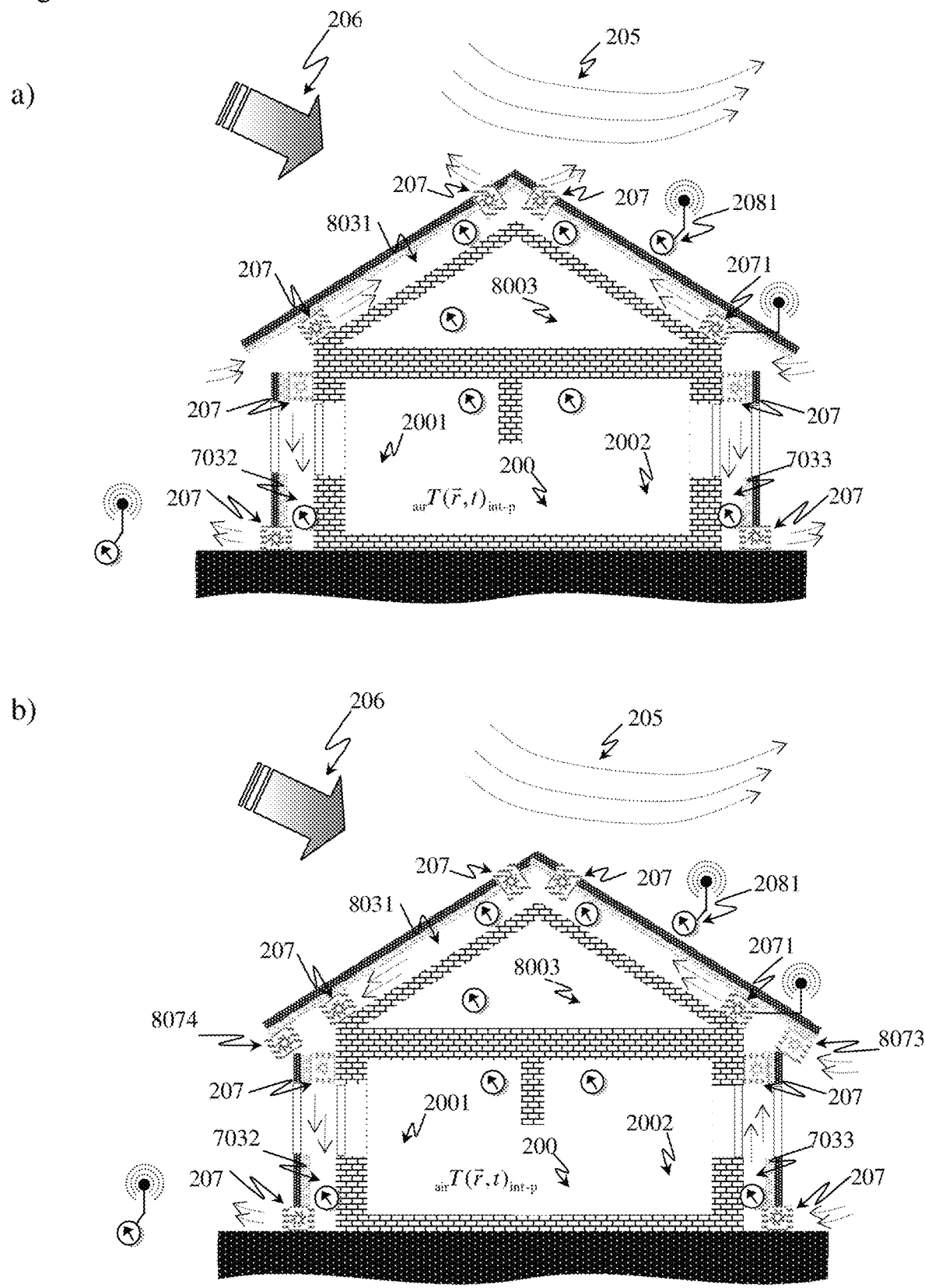
FIGS. 8a and 8b schematically illustrate buildings with a similar cross section as in FIG. 7, but with an attic secondary compartment that forms a smaller space that is predominately located between an outer wall and an inner wall.

FIG. 8 is comparable to FIG. 7 and illustrates highly schematically and not to scale an embodiment of the disclosed invention of a building with a similar cross section as in FIG. 7, here a type of gable roof (regardless of actual pitch). However, in FIG. 7 the secondary compartment 4031 comprised effectively the entire attic space, whereas in the embodiment shown in FIGS. 8a and 8b said secondary compartment now forms a smaller space 8031, which is predominantly located between an outer wall and an inner wall. In some such embodiments said secondary compartment 8031 may effectively be created by at least partially hollow walls. The advantage is that the attic space may become a primary compartment 8003, which can be used for any of said primary purposes of the building.

Again, one particular mode of airflow within said secondary compartments 8031, 7032, and 7033 is schematically illustrated. Clearly, depending on the direction in which said actuators 207 and 2071 permit or drive air flow, various combinations are possible, in which direction air flow through the individual secondary compartments can occur (resulting, among other physical effects, in differences in thermal gain or loss), which is precisely what said electronic controller 209 will determine based on said ROM/SDNM in order to achieve a specific control target in the disclosed manner. Again, said electronic controller 209 has been omitted in this figure.

The notable difference between FIGS. 8a and 8b is the presence of additional actuators 8073 and 8074 (functionally equivalent to either 207 or 2071) close to the soffit of the roof, thus together with the two proximate actuators forming a T-junction like shaped pathway (in some modes similar a three-port valve), which permits a larger number of possible pathways, some of which can be beneficial.

Let's assume a building with at least at some locations a cross section similar to the one shown in FIG. 8b and that said actuators are principally placed in the illustrated manner. Let's furthermore assume that there is a relatively high level of solar irradiance, also arriving from a directions as shown (upper left), and that it is desirable to reduce the rate of increase in thermal budget (or stored thermal energy) of the primary compartment, which would result in an increase in temperature or would otherwise have to be countered by expending supplied energy to operate an AC system. Under such conditions it is desirable to drive said actuators such that external air predominantly is taken in on the shaded side, passing through secondary space 7033, then passing from the right side into said secondary compartments 8031.

The actuators 8073 on the shaded (right) side may either be closed or permit/support also partial inflow. The air then continues to the left side of said secondary compartments 8031, which is predominantly exposed to solar irradiance. The actuators 207, which are located close to the ridge are closed. The air then continues into secondary space 7032 (actuators 8074 on the left side is also closed) and flows out through actuator 207 at the bottom left side. Such a flow scheme will reduce the rate with which thermal energy reaches said primary compartment as a result of solar irradiance primarily from the left side. Thus, it reduces an increase in temperature and/or it reduces the required supplied energy for an AC system. This is of course a highly simplified example. What specifically the optimal values of in- or outflow rates at what time are is precisely what said controller will determine in the disclosed manner.

Conversely, under conditions of again relatively high solar irradiance but relatively low outside air temperature, i.e, when any or a more rapid increase in thermal energy with said primary compartment is desirable, a flow in reverse as described above may be desirable, effectively moving thermal energy to the shaded (colder) side of the building.

The illustration is highly schematic, and in particular the proportions between the sensors 208 and the secondary compartments are exaggerated. It is not meant to imply that the sensors restrict the air flow in said secondary compartments.

Figure 9:
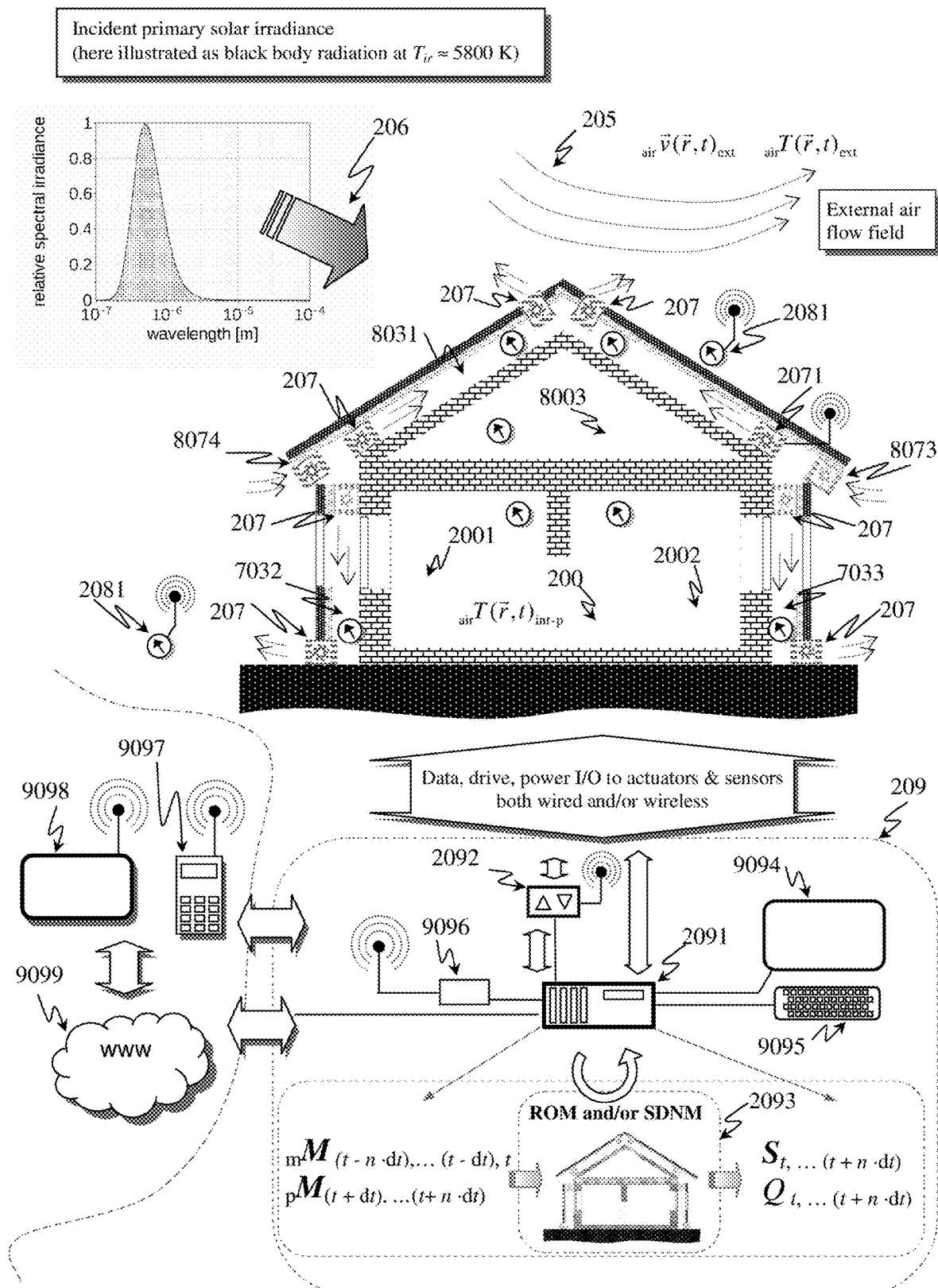
FIG. 9 schematically illustrates a building with a similar cross section as in FIGS. 8a and 8b, with an electronic controller.

FIG. 9 is comparable to FIG. 8 and illustrates highly schematically and not to scale an embodiment of the disclosed invention of a building with a similar cross section as in FIG. 8, here a type of gable roof (regardless of actual pitch). Again, one particular mode of airflow within said secondary compartments 8031, 7032, and 7033 is schematically illustrated. Clearly, depending on the direction in which said actuators 207 and 2071 permit or drive air flow, various combinations are possible, in which direction air flow through the individual secondary compartments can occur (resulting, among other physical effects, in differences in thermal gain or loss), which is precisely what said electronic controller 209 will determine based on said ROM/SDNM in order to achieve a specific control target in the disclosed manner. The illustration is highly schematic, and in particular the proportions between the sensors 208 and the secondary compartments are exaggerated. It is not meant to imply that the sensors restrict the air flow in said secondary compartments.

Furthermore, in this embodiment said at least one processing unit 2091 has at least one human-machine interface comprising a display 9094 and/or a keyboard 9095 (which in some embodiments may also be a touch screen). In some embodiments there are options for voice based interactions with said at least one processing unit. In some embodiments at least one processing unit 2091 may be connected to a computer network used within said predominantly enclosed space and a person may use another computer on said network to exchange date, including commands, with said at least one processing unit.

Furthermore, schematically shown is said at least one processing unit 2091 of said control system 209 at least temporary achieving connectivity to the internet and/or a cell network for mobile devices. In some such embodiments said control system 209 is directly connected to the internet using an ethernet network already present in said predominantly enclosed space. In some embodiments said control system 209 may further comprise or exchange data with at least one module 9096 at least in part compatible with any wireless cellular network, or any one of IS-95, IS-2000

(CDMA), EV-DO, GSM, EDGE, UMTS, LTE, HSPDA, WiMAX (IEEE 802.16), LIVID S/WiBAS, HiperMAN, HiperLAN, iBurst standards, or a radio-transmitter compatible with any future comparable such standard (incl. '5G'). As one specific example, USB GSM/3G/4G modems may serve as such a module.

Thus, in some embodiments remote (or local) mobile devices such as telephones 9097, including so-called smartphones, or other effectively mobile computers, incl. so-called pads 9098, may be used to communicate with said control system 209 either via the internet 9099 and/or a mobile phone network, and/or any other communication at least partially comprising such forms of data exchange.

Clearly, these additional features in FIG. 9 are independent of the actual cross section and structure of the specific building and number and shape of primary and secondary compartments It shall be noted that the disclosed invention is applicable to a wide variety of predominantly enclosed spaces ranging from simple shacks, shelters, tents, containers, temporary or emergency housing units, mobile homes, trailer, or vans, to high-end energy-consumption optimized villas and other houses (incl. so called "zero-energy house") in the first world. This also includes structures, which are being used for fabrication or storage of goods or equipment, including storage of food, garages, office buildings, compute centers (server farms), and even high-rising buildings typically found in the center of modern cities.

Furthermore, the invention relates to any other predominantly enclosed spaces, which are exposed to electromagnetic radiation at least in the VIS and NIR wavelength range, as well as temporally varying levels of ambient air temperature and ambient air flow velocity and direction, and wherein it is desired to reduce temperature variations on the inside of said predominantly enclosed spaces while minimizing or completely eliminating the energy expenditure for required heating or cooling, and/or wherein it is desired to reduce the time to reach a desired temperature on the inside of said predominantly enclosed spaces, and/or wherein it is desired to increase the precision with which the temperature inside said predominantly enclosed spaces can be controlled.

Traditionally, conventional indoor temperature and climate control systems of buildings are predominantly 'reactive' in the sense that they operate by activation and modulation of networked thermal energy sources and sinks in spaces based on thermostatic feedback, i.e. they comprise conventional control loops, which react to a deviation from a control target, after such a deviation occurs.

In contrast, in preferred embodiments of the disclosed invention said control system has sufficient data storage capacity and computational power to at least in part be able to execute an algorithm to achieve at least one desired target. The disclosed control system posses an internal model to anticipate thermal reactions of the building and to derive desirable control actions to achieve its at least one control target. In order to realize such a model-based control strategy, said control system incorporates a simplified virtual model, here referred as ROM/SDNM of the building, which in some such embodiments runs effectively numerical simulation parallel to the building's actual physical operation.

As mentioned above, the thermal behavior or the thermal budget of predominantly enclosed spaces, such as buildings or similar habitats, is a classic example of a highly complex multi-physics-problem, i.e., a problem where numerous different physical effects or phenomena play a role in a coupled manner, i.e., simply put, in general the results of (any) one effect will have impact on the degree to which (any) another effect plays a role. As such, related (coupled) to the energy budget of a building are the temperature distribution in the structure (walls) of said building, as well as air flow (speed, direction), temperature and humidity inside and within the direct vicinity of said building. (Subsequently, walls shall be understood to mean both vertical as well as horizontal structures (i.e., floors and sealing) as well as any other spatial orientation. Likewise, the envelope of a building shall subsequently be understood to comprise any elements which define the outside shape of a building, regardless of spatial orientation and regardless from which material they are made, for example including but not limited to wall, windows, roofs, etc. and regardless if such a distinction is possible.)

The meaning of "thermal behavior" and "thermal budget" shall be understood to comprise at least:
  the rate with which a building absorbs or emits energy
    under given constant and/or time-dependent external and/or internal loads,
  (thus including the total and 3D spatial distribution of heat capacity)
  3D spatially and temporally resolved temperatures of bulk materials and air
    as a result of such constant and/or time-dependent external and/or internal loads
  the power (energy) required, i.e., to be provided or absorbed by internal and/or external loads to keep at least bulk materials and/or air of at least parts of a building within a certain temperature range, and as a specific case
  the power (energy) required, i.e., to be provided or absorbed by internal loads to keep at least bulk materials and/or air of at least parts of a building within a certain temperature range under given function of or external time-dependent loads.

Some of the associated physical and numerical aspects will subsequently be discussed. One of the problems when modeling the thermal behavior of a building is to accurately predict the above mentioned spatially and temporally varying quantities for a given building and for given external and/or internal loads. Load shall be understood to comprise any from of energy source or sink. For example, internal loads can be heaters of any kind (e.g. an electric heater, gas burning oven etc.) or an air conditions system as an example of a sink. External loads are primarily the external air flow field as well as solar irradiance.

As is well known, thermal energy (heat) Q [J] or [Ws] can be transferred by thermal conduction, convection, or electromagnetic radiation, also referred to as "radiative thermal energy transfer" or "thermal radiation", which typically refers to electromagnetic waves in the UV to FIR range. All these effects need to be considered in a high fidelity simulation. Some underlying aspects will subsequently be briefly discussed.

Henceforth, electromagnetic irradiance, also referred to as radiative flux, or radiant flux density, i.e., power per area, shall be denoted as $\Phi_r = P/A$ in [W·m$^{-2}$]. Radiative thermal energy transfer is primarily governed by the following laws:

Planck's law describes the spectral distribution of the radiative flux, i.e., spectral radiance, an ideal black body emits as a function of temperature and wavelength. Expressed in differential form $$d\Phi_r(\lambda,T) = 2\pi h c^2 \lambda^{-5} \cdot (\exp(hc\lambda^{-1}k^{-1}T^{-1}) - 1)^{-1} d\lambda$$

it gives the radiative power density per wavelength "slice", wherein h=6.63·10$^{-34}$ Ws$^2$ is Planck's constant, c=3·10$^8$ m/s is the velocity of light, and k=1.38·10$^{-23}$ Ws/K is Boltzmann's constant.

(An approximation to Planck's law is Wien's law, here again in differential form:

$$d\Phi_r(\lambda,T) = 2\pi hc^2 \lambda^{-5} \cdot (\exp(hc\lambda^{-1}k^{-1} \quad T^{-1}))^{-1} d\lambda$$

which somewhat underestimates spectral radiance at wavelength larger than the wavelength of the maximum spectral radiance.)

We shall give a few examples for irradiance levels of ideal black bodies at temperatures not uncommonly found on earth within the environment. For example, at T=293.1 K=20° C. the irradiance is $\Phi_r$=412 W/m$^2$, at an only 20 K higher temperature of T=313.1 K=40° C. it already increases to P=537 W/m$^2$ and at T=365.8 K=92.7° C. it reaches P≈1 kW/m$^2$.

However, at T=5780 K, the surface temperature of the sun, the radiance of an ideal black body reaches 62 MW/m$^2$. This extraordinary increase in power emission efficiency with temperature is one of the reasons why the sun, at it's given size, can emit such an enormous power (≈4·10$^{26}$ W) that the solar irradiance at the average distance to earth, i.e. above earth' atmosphere, is about 1370 W/m$^2$, despite the large distance to the sun.

By integrating Planck's law over all wavelengths Stefan-Boltzmann's law can be derived, which makes more apparent this (highly non-linear) correlation between the temperature and the total radiated. i.e. emitted power density (per area), i.e. radiative flux or irradiance, of an ideal black body $$\Phi_r = \sigma T^4$$

with σ≈5.67·10$^{-8}$ W m$^{-2}$ K$^{-4}$ being the Stefan-Boltzmann constant. Furthermore noteworthy is that the lower the temperature of an object, the more is the spectral distribution of the emitted radiance shifted towards larger wavelength. The value of the wavelength where the spectral radiance has its maximum, as a function of temperature can be derived to be $$\lambda_{max}(T) = 0.201 \cdot hc\lambda^{-1}k^{-1}T^{-1}$$

$$\lambda_{max}(T) = 2.9 \cdot 10^{-3} m/K \cdot T^{-1}$$

For example, at T=5780 K, the temperature of the surface of the sun, $\lambda_{max}$≈0.5 μm, whereas for example at the mentioned temperature of T=365.8 K=92.7° C. the highest spectral irradiance is at approximately $\lambda_{max}$≈8 μm. At a room temperature of T=293.1 K=20° C. the maximum of the spectral radiance is at $\lambda_{max}$=9.9 μm.

To describe the reduced emitted power density of non-black bodies, an additional dimensionless multiplicative factor, the spectral emissivity dε(T,λ) [0,1] is introduced. If integrated over all wavelengths, this factor represents the emissivity s relative to a perfect black body. Following Kirchhoff's law, we will here assume emissivity and absorptivity dα (T,λ) (i.e., the ration of absorbed to incident radiation, either per wavelength, or integrated over the considered spectrum) to be effectively identical. Related to emissivity is spectral reflectivity, or integrated over al wavelength referred to just as reflectivity, which is given by (1−ε), or correspondingly (1−α)

Convective transfer of thermal energy is primarily energy transfer as a result mass transfer of a fluid, here in particular of air flow. This can be either forced convection (external, e.g. wind, or internal, e.g. due to the use of fans) or free or "natural" or "induced" convection (air flow) as a result buoyancy effects due to internal and/or external air density differences as a result of temperature differences (e.g. as a result of local differences of the solar irradiance). Furthermore considered must be induced air flow as a result of aerodynamic effects, e.g. whereby external flow can (cause dynamic) pressure differentials (Bernulli's principle, Venturi effect).

As already mentioned above, the three modes of thermal energy transfer a) radiative energy transfer b) conductive thermal energy transfer, and c) convection (mass flow) are therefore three of the dominating physical mechanisms (of numerous physical effects, which have influence on the thermal budget of a building, depending on a particular structure), which typically at least need to be considered in an High Fidelity Numerical Model (HFNM) of the thermal behavior of a building since it permits to obtain the resulting spatial distribution of stored thermal energy and which is furthermore essential for thermal management as disclosed.

The rate at which a building absorbs or emits energy is at least in part determined by any one or any combination of the following effects radiative gains as a result of solar radiation or, typically to a lesser degree, thermal radiation emitted from surrounding surfaces radiative losses of a building to the outside, particular under conditions of negligible solar input thermal conduction of heat through solid or liquid portions of the structure of a building (primarily walls including door and windows, as well as roofs and floors). Liquid or liquid crystalline structures may be present in reservoirs, pipes, or other elements, which can be installed to enable increase of thermal capacity and/or redistribution of thermal energy.

In order to assemble a reasonably accurate mathematical model of the thermal behavior of a building one needs to consider in a 3D spatially and temporally resolved manner the coupled effects of externally imposed airflow (wind) and the resulting convective thermal gains or losses, radiative gains from solar energy and radiative losses if the surfaces of buildings can emit toward colder surroundings (e.g. the night sky), induced air flow (outside as well as inside a building) as a result of thermal gradients (both as a result of radiative gains or other internal loads) and resulting redistribution of energy as well as thermal gains or losses, actively driven air flow (outside as well as inside a building) and resulting redistribution of energy as well as thermal gains or losses, and any other heat source or sink within a building or its vicinity.

Again, these are in general all time- and spatially dependent three-dimensional scalar or vector function. In principle, the basic equations which describe at least some of these phenomena are namely the Navier-Stokes equations, which describe fluid (air) flow and provide time- and spatially dependent fluid velocity, and pressure.

Navier Stokes equations are a system of nonlinear coupled partial differential equations, based on the assumptions that a fluid is a continuous medium (i.e., the molecular nature can be ignored, which is certainly true for air at the scale of buildings and atmospheric pressure), that the medium is a Newtonian fluid, and furthermore on the following laws to be valid within the medium: conservation of mass, Newton's second law (conservation of momentum), conservation of energy, Fourier's law of heat conduction, and the existence of a state equation for density, pressure, and temperature, and finally relationships for viscosity and thermal conductivity. A detailed discussion of these equations is beyond the scope of the disclosed invention.

It is sufficient to realize that Navier-Stokes equations, while essential to model the airflow, are numerically inherently difficult and computationally expensive to solve. Thus in some cases the simplification of using only Euler equations may still provide acceptable results, which can be solve with somewhat less but still considerable numerical effort.

Thermal conduction (e, g, the walls of a building) as result of a (in general time-dependent) temperature gradient can be described by Fourier's Law $q_n$ (r, t)=−k (r)·A (r)·∂T/∂n(r, t) Again, bold letters shall denote vector quantities. The flow of thermal energy, i.e., heat per time or heat flow rate $q_n$=Q/t [W] is a form of thermal power (a scalar), and hence heat flux (density) is given by q (r, t)=$q_n$ (r, t)/A (r) [W/m$^2$] is a form of power per area (through which it passes), which is given by the local thermal conductivity −k (r) [W/(m·K)] multiplied with the negative local temperature gradient −∂T/∂n(r, t) [K/m], and thus a vector.

Therefore, highly relevant for modeling the thermal behavior of a building is knowledge of the spatial distribution of the thermal conductivity k(r) of any bulk materials (this shall in a general sense also include e.g. the equivalent thermal conductivity of multi-pane windows etc.) as well as the thermal conductivity of air. Typical values for solids can range from about 1 W/(m·K) for some plastics and $SiO_2$ glass to 380 W/(m·K) for copper at room temperature. Some foams can have thermal conductivity values of less than 0.1 W/(m·K), although these are not real "solids". Typical values for liquid range from about 0.2 to 10 W/(m·K), for gases from 0.01 to 0.5 W/(m·K). The point is that relevant values range over several orders of magnitude, which makes obtaining valid numerical solutions more difficult.

Beside knowledge of the spatial distribution of thermal conductivity within a building, the spatial distribution of heat capacity has to be know, which describes the relationship between a change in temperature and a change in thermal energy of an object (material). We will subsequently denote any type of relative heat capacity with a small c and the total heat capacity (in the context of buildings sometimes referred to a "thermal mass") of an object with capital C [J/K].

As is well know, we distinguish between molar heat capacity $c_n$ in [J/(mol·K)], i.e., heat capacity relative to the number of atoms or molecules, specific heat capacity $_m c_p$ in [J/(kg·K)], i.e., heat capacity relative to mass, and volumetric heat capacity $_v c_p$ in [J/(m$^3$·K)] i.e., heat capacity relative to volume. Obviously, the volumetric heat capacity of a substance can be derived from its specific heat capacity by multiplying it with its density ρ in [kg/m$^3$]. These are isobaric heat capacity values, as indicated by the index p. It is interesting to note that for most simple (mono-atomic) solids the molar heat capacity is approximately constant, as expressed by Dulongs-Petit's law $c_n \approx 3 \cdot R$ $\approx 3 \cdot 8.3 J/(mol \cdot K) = 25 J/(mol \cdot K)$ with R being the universal gas constant. There are of course significant differences with respect to specific and volumetric heat capacity. The combined influence of thermal conductivity k in [W/(m·K)] and volumetric heat capacity ρ ·$c_p$ in [J/(m$^3$·K)] is referred to as thermal inertia, or sometimes as thermal effusivity, and defined as e=(k·ρ ·$c_p$)$^{0.5}$.

Simulating the thermal behavior of a building comprises what is referred to as a conjugate heat transfer problem, since simultaneously solutions to temperature distributions in solids as well as in a fluid are required, which further increases the numerical difficulty. (These types of numerical problems are considered to be "μl-conditioned".)

Thus it is Apparent that in Order to Describe the Thermal Behavior and Air Flow in an in the Vicinity of a Building, Time-Dependent Solutions to Very Large Systems of Coupled Differential Equations are Required.

However, it is effectively impossible to find any direct analytical solution for these equations for any realistic 3D geometry (finite size, no or weak symmetry). At best, for some trivial, highly simplified abstract examples (usually 1D or 2D problems) analytical expressions in from of approximations by (typically infinite) series of functions may be found. Therefore, any serious and accurate analysis (prediction) of the thermal behavior of a building must be based on numerical models and numerical solution methods to solve the underlying coupled differential equations of a discretized model of at least one given building.

The more of said physical effects are incorporated into a mathematical model, and the better (more accurately) material constants (or functions) are known, the more precisely such a model can predict the thermal behavior of the described building. Such models consist, at least conceptually, of a potentially large set of coupled differential equations and non-differential equations. (Conceptual in a sense that in order to solve them they may never actually be explicitly written down since one may start immediately with numerical or semi-numerical method to obtain solutions, such method implicitly being based at least in part on said equations. See below.)

Creating such discretized models and obtaining the corresponding solutions is difficult and computationally highly demanding, but possible. In particular, typically any one or any combination of the following numerical methods is used: Finite Element Method (FEM), Finite Difference Method (FDM), Finite Volume Method (FVM), Monte Carlo Method, Boundary Element Method (BEM), often also in combination with iterative methods including but not limited to successive approximations.

Regardless of the specific numerical method(s) one needs to know and consider as input for a HFNM at least the 3d spatial geometry of the building (i.e., shape of all structural and other elements)

thus also providing enclosed air volumes, the 3d spatial distribution of heat capacity of materials which constitute a building (enabeling also to compute the total heat capacity of a building materials), the 3d spatial distribution of thermal conductance (of bulk material, including windows)

in a building, the 3d spatial distribution of specific spectral electromagnetic properties (typically UV to FIR reflectivity) of bulk materials and surfaces in a building, the 3d spatial distribution of spectral electromagnetic properties transmission of any windows (i.e., transmittance/reflectance as function of wavelength), if present, the spatial distribution of phase change materials within a building and the corresponding phase transition enthalpies [J/kg], if present, location, size, and parameters of other energy sources or sinks (e.g. AC), and if present, location, size, and parameters of actively driven air.

A particular difficulty associated with obtaining the required solutions arises from the fact that the HFNM has to consider numerous coupled physical phenomena, including but not limited to surface and volume phenomena, as well as mass transport. For example, this may include but is typically not limited to consider buoyancy effects in many cases as part of the analysis. Moreover, some components, such as fans, i.e., actively driven flows, are themselves complicated numerical problems and difficult to simulate from first principles. (Thus, fans can in some instances be simplified as momentum sources and/or corresponding boundary conditions.) In addition, in some embodiments, which require a particularly high level of accuracy, multiple (cascading) events of surfaces emitting and receiving electromagnetic radiation (UV to FIR) may be required to be considered within a HFNM.

Given the time constants of relevant effects in typical buildings, some of these phenomena must in many embodiments be treated as dynamic (or transient), as opposed to steady-state, i.e. it can in general not be assumed that a building is in thermal steady state (although such conditions can be reached). Moreover, temperature dependence of material properties, particular specific heat and/or emissivity will make the problem nonlinear. In addition, any phase change in materials significantly contributes to a further increase in the level of difficulty. In such embodiments said walls comprise at least in part a material, which undergoes at least in part at least one phase change of its molecular structure at a temperature which is between the minimum and maximum operating temperature (e.g. certain liquid crystals), an effect than can be used for thermal energy storage.

As explained in more detail above (description of FIG. 3), once the HFNM has been created, numerical simulations are executed several times. While some of the data required to generate the ROM/SDNM can be obtained with a single solution of said HFNM (e.g. computation of total heat capacity), others will require several solution under changing boundary and initial conditions, for example changing directions external air flow fields, i.e. time-dependent wind speeds and directions, time-dependent humidity levels, etc. as well as changing directions of solar irradiance (including e.g. also spectral shift, e.g. due to cloud and/or fog with varying degree of water content).

The obtained solution data for each simulation (i.e. specific solutions of the HFNM for a specific set of boundary and initial conditions) include for example the time dependence of air temperatures in various compartments, time dependence of bulk and surface temperatures of walls or other means of separating compartments (in general, there are of course time-dependent 3d temperature profiles within all bulk materials).

Said solution data are being used to generate and refine said ROM/SDNM. The process of obtaining solutions to the HFNM is in some embodiments repeated in an iterative manner until the ROM/SDNM reaches an acceptable level of accuracy compared to the HFNM. It is helpful during this step to know the location of said sensors 208 and 2081 as well as said actuators 207 and 2071 and type of input data, since ultimately these data are the once which the ROM/SDNM will be given during future practical application to derive its control strategy from. Conversely, said iterative process can also serve to find desirable locations for said sensors and/or actuators. In other words, the measured sensory data $_mM_t$, which form the input data for said ROM/SDNM, can be considered to cover relatively high-dimensional (parameter) space, and for each specific vector $_mM_t$ represents a specific state of internal and external conditions within this space, and for which the ROM/SDNM must at least be able to provide the thermal system state $S_t$ (or thermal budget) of said building (and the total stored thermal energy $Q_t$) within a certain error margin.

For the purpose of this invention, the term "reduced order model" ROM shall be understood to comprise any method, which is able to derive, produce, successfully guess, or otherwise generate a set of linear and or nonlinear equations, which approximate the thermal behavior of a predominantly enclosed space, typically a building, but which are computationally less expensive to solve than the underlying differential equations. In some embodiments deriving the ROM may comprise methods comparable to those employed in various types of Design of Experiments (DOE), specifically also including Optimal Design of Experiments (ODOE).

For the purpose of this invention, the term "simplified discrete numerical model" (SDNM) shall also be understood to include a derived smaller (simpler) numerical model (e.g. a relatively small FEM model), which is numerically less expensive to solve (less main memory, less floating point operations) due to a reduced number of degrees of freedom and/or due to an optimized level of discretization (meshing), and/or use of higher order elements, which reduces the numerical problem size (typically sparse systems of linear equations) while maintaining an acceptable level of prediction accuracy.

This is based on recognizing that in several scenarios a very considerable reduction in the number of elements and nodes (in case of FEM) can be achieved, if nodes are placed at specific locations within the sold model. (In some embodiments finding such locations can be an iterative process, which in turn becomes part of the steps to be undertaken to generate the ROM/SDNM.)

In some embodiments one or more of such ROMs and SDNMs are combined to be executed in said at least one "control system" or "electronic controller" 209, specifically within said processing unit 2091 to derive control signals for said actuators 207 which at least approximate any one or any combination of system targets of reducing the average energy expenditure for keeping at least one primary compartment of a building within a desired temperature range by means of active air conditioning, or reducing temperature variations during a typical 24-hour cycle within said at least one primary compartment of said building, or reducing one or both of the average temperature or the peak temperature of said at least one primary compartment of said building.

One of the distinct benefits of the disclosed invention of deriving and using ROMs/SDNMs for subsequent system control of the thermal budget is that the required computations can be executed on (by today's and future standards) small computers and/or controllers (in terms of there DRAM size and FLOPS), i.e., on relatively inexpensive hardware systems. Predictions of the thermal budget and control strategy decisions can be computed in some embodiments in fractions of seconds, if ROMs/SDNMs are used, compared to hours or days for solutions of the underlying full scale HFNM. The continued decline on price for a given level of compute performance will further strengthen this aspect.

This benefit of the disclosed invention shall be further illustrated by two technical analogies.

By way of a first analogy, during (SCUBA) diving the human body absorbs nitrogen in blood and tissue depending on the depth profile of the dive, which needs to be gradually released (at shallower depth) to avoid decompression sickness. Originally, relative simple dive tables were developed and are still being used as guidelines, which provide roughly the required decompression times after exposure to a specific (constant) dive depth for a specific dive time. In reality, most dives are not executes by staying at a one specific depth for most of the dive, instead a diver will desirably follow an arbitrary depth profile, thus absorbing (and releasing) nitrogen at varying rates. What makes this problem complicated is the fact that the human body is of course a very complex and in general a continuous system (or in this context a gas absorber) wherein various organs, tissues, fluids, etc have varying absorption coefficients. Thus, a high fidelity prediction of the absorbed amount of nitrogen and the required decompression time would required a 3d numeric model of (a typical or specific) human body (i.e., the entire geometry of all relevant organs) spatially discretized with sufficient resolution and assuming all "material" properties are known.

However, it was eventually realized (major contributions by Albert A. Bülmann) that as a sufficiently good approximation the human body can in terms of nitrogen absorption and release (correspondingly for other gases) be represented by a finite (and relatively small) number of discrete (imaginary) compartments (16 compartments given by Bülmann), for which absorption rates (some times given as half-times) are know. (The electric equivalent would be a network of 16 series RC-circuits.) Thus the problem of computing the nitrogen load as a result of an arbitrary dive profile can be reduced to (a sum of) one-dimensional numerical integrations. This is something a modern battery powered microprocessor can easily do, thus, enabling the dive compute. (Many models are e.g. based on a Bülmann ZHL-12 or ZHL-16 algorithm, depending on how many compartments are considered.) It is noteworthy that this is nowadays for a digital computer a negligible computational effort, but it was still a considerable challenge during the development of the first digital dive computers in the mid 70's. Even earlier attempts to build a dive computer based on effectively mechanical-pneumatic elements (essentially making it an analog computers) were generally not very successful.

By way of another analogy this is comparable to generating a schematic of an electronic circuit, which is a simplified model describing the more complex physical processes, which occur in each electronic element, such as transistors, diodes, logic gate, or even more complex subunits such as operational amplifiers, each of which are represented in a simulation of said electronic circuit as at least one mathematical function, which approximately represent the typically complex physical effects in each said element. Thus, solutions to the behavior of the electronic circuit (which from a physical standpoint is a 3d conglomerate of copper, doped silicon, silicon oxide, other metals, etc.) can be obtained with much less computational effort compared to attempting to create and solve a numerical method of the underlying physical effects. (In microelectronics R&D this is typically referred to as device simulation, e.g. to numerically predict the performance of a transistor based on knowledge about shape, size and distribution of dopant levels in the used semiconductor material(s).)

Getting back to the disclosed inventions, similarly a building does absorb and release thermal energy at least as a result of a) the "exposure profile" to solar irradiance (as a function of direction and time), wind speed (as a function of direction and time), air temperature (as a function of time), air humidity (as a function of time), etc., b) active internal energy sources or sinks (e.g. ovens or AC systems), and c) changes in air flow in said secondary compartments.

The advantage of using ROMs/SDNMs of the underlying physics is that said controller 209 can assess the thermal budget of a specific building and make prediction with comparatively little computational effort and can derive desirable control strategies on how to drive said actuators 207.

While in general the thereby derived control/drive signals for said actuators will be relatively complicated functions (also depending on the number of secondary compartments, the number of actuators etc.) a few trivial examples shall be given to further illustrate some of the benefits of the disclosed invention.

Let's assume a building with at some locations a cross section similar to the one shown in FIG. 8b and that said actuators are principally placed in the illustrated manner. Let's furthermore assume that there is a relatively high level of solar irradiance, also arriving from a directions as shown (upper left), and that it is desirable to reduce the rate of increase in thermal budget (or stored thermal energy) of the primary compartment, which would result in an increase in temperature or would have otherwise to be countered by expending supplied energy to operate an AC system. Under such conditions it is desirable to drive said actuators such that external air predominantly is taken in on the shaded side, passing through secondary space 7033, then passing from the right side into said secondary compartments 8031. The actuators 8073 on the shaded (right) side may either be closed or permit/support also partial inflow. The air then continues to the left side of said secondary compartments 8031, which is predominantly exposed to solar irradiance. The actuators 207, which are located close to the ridge are closed. The air then continues into secondary space 7032 (actuators 8074 on the left side is also closed) and flows out through actuator 207 at the bottom left side. Such a flow will reduce the rate with which thermal energy reaches said primary compartment as a result of solar irradiance primarily from the left side. Thus it reduces an increase in temperature and/or it reduces the required supplied energy for any AC system. This is of course a highly simplified example. What specifically the optimal values of in- or outflow rates at what time are is precisely what said controller will determine in the disclosed manner.

Conversely, under conditions of again relatively high solar irradiance but relatively low outside air temperature, i.e, when any or a more rapid increase in thermal energy with said primary compartment is desirable, a flow in reverse as described above may be desirable, effectively moving thermal energy to the shaded (colder) side of the building.

In some embodiments the generation and/or refinement of said ROM/SDNM may be also supported by executing measurements of the thermal budget on an actual similar (or even identical) building, i.e. it is measured how the thermal budget reacts to varying external and/or internal loads and other environmental conditions, thereby providing additional data point to create and or refine said ROM/SDNM. In some embodiments the generation and/or refinement of said ROM/SDNM may be predominantly done by executing measurements of the thermal budget on the actual or similar (or even identical) building.

In some embodiments the disclosed invention will have other or additional benefits such as reducing the long-term consumption of building materials (and related expenses) by increasing the interval between required repairs, specifically for materials made at least in part from wood and/or other organic materials. This can be achieved by including as control target for example to maintain certain humidity levels and/or temperature levels in said secondary compartments, which in some embodiments will reduce aging (or decay) of at least some parts of wooden structures, if present. In such embodiments said controller 209 may for example preferentially permitted air flow in said secondary compartments under conditions of relatively low humidity of the external air and suppressed or reduced air flow under conditions of relatively high humidity, based on data from said sensors 208.

Thus, in some embodiments said at least one electronic controller 209 is also executing at least one algorithm, either entirely in software and/or at least partially in hardware (e.g. in FPGAs), which at least in part serves to at least approximate any one or any combination of system targets of reducing the average expenditure of at least one resource within one both of
at least one primary compartment of a building or
at least one secondary compartment of a building.

Thus, in some embodiments said at least one electronic controller 209 is also executing an at least one algorithm, either entirely in software and/or at least partially in hardware (e.g. in FPGAs), which at least in part serves to at least approximate any one or any combination of system targets of affecting in at least one secondary compartment on average and within a certain numeric range a certain amount of air throughput and said air being within another certain numeric range of a certain humidity level, or affecting in at least one secondary compartment on average and within a certain numeric range a certain amount of air throughput and said air having within at least one other certain numeric range of at least one chemical or physical property.

There are Several Preferable Embodiments with Respect to Said Control System.

The processing unit 2091 of said control system 207 may be based on any one or any combination of suitable computational architecture, incl. for example ARM as well as x86, x86-64 (Intel, AMD, VIA) based systems, in particular embedded system modules, single board computers, or boards with Micro-ATX, Mini-ITX, Nano-ITX, or Pico-ITX (VIA Technologies) form factor, any embedded systems, furthermore any so called "system on a chip" (SoC) e.g. Snapdragon, and may in some embodiments at least partially also comprise FPGAs and/or PLCs. The chassis and/or bus structure of said processing unit 2091 may in some embodiments be based on PCI, PXI, PXIe.

To give a few additional specific examples, this may in some embodiments comprise hardware based on Ardunio Mega/Uno/Yun/Zero, Banana Pi, BeagleBone Black/X15, ESP8266, Jetson TK1 (Nvidia), Raspberry Pi 2/Zero systems (ARM CPU based), and more on the higher end e.g. Jetson TX1 (Nvidia).

While the prediction of directional chance of solar irradiance is relatively simple (and entirely possible without real time input into the controller), in some embodiments said control system may electronically receive weather forecast data, which it uses to calculate estimates of expected future changes to the energy budget of said building, and wherein such estimates are used to enhance the performance of said control system. In some such embodiments said control system may receive said weather forecast data via an at least temporarily established internet connection. For example, expected times of chance in solar irradiance e.g. as a result of clouds to further can be used to enhance its control strategy.

In some embodiments said control system has sufficient data storage capacity and computational power to be at least in part based on an algorithm to achieve at least one desired target, and to also retain previously obtained signals and/or data corresponding to such signals, subsequently also referred to as 'historic data', obtained from at least one of said sensors, and uses said historic data to improved over time its performance. In some such embodiments said data also comprise historic performance data, i.e. data, which are at least in some degree a measure how well the control system performed. A measure for performance may in some embodiments be e.g. how precisely or quickly a desired targeted temperature on the inside of said predominantly enclosed space has been reached, for how long a certain temperature range could by maintained, or how much additional supplied energy, e.g. in form of electricity or gas, had to be used to maintain such a temperature range. In other words, said control systems improves its performance by learning form previous, accumulated experience. In some such embodiments said control system may use such historic data to enhance or correct said ROMs/SDNMs, i.e. it may correct or fine-tune certain parameters of ROMs/SDNMs, in other words said control system learns over time to better predict the response to certain inputs (e.g. solar radiation) and to its own actions, and thus improves its control strategy accordingly. In some such embodiments said control system may retain such historic data ranging from a few days to a few years, in particular including complete seasonal cycles. In some such embodiments said control system may retain such historic data during its entire lifetime.

In some additional such embodiments such collected historic data (sensor data, performance data, reduced order model data), in particular including complete seasonal cycles, are collected by a first control system on one specific building, and are later provided to and stored in a single or plurality of other (typically new) control systems, which will control a similar building. In other words said control system incorporates learning experience previously obtained by similar control systems e.g. on similar buildings.

In some embodiments said control system is at least temporarily being connected to the internet and provides any one or any combination of the following services comprising: In some such embodiments said control system is sending status and performance data per email. In some such embodiments said control system enables remote log-ins to display status and performance data on a remote computer or a remote mobile device. In some such embodiments said control system enables remote log-ins to manipulate the operation of said control system, including to change control target data, from a remote computer or a remote mobile device, including in particular from a so-called smart phone or so-called wearable device.

In some embodiments said control systems from a plurality of buildings are at least temporarily connected to the internet, and are providing any one or any combination of the following services comprising: In some such embodiments said control systems from a plurality of buildings are at least temporarily connecting to a common web site, and are transmitting status and/or performance data. In some such embodiments said web site enables user log-ins to said control systems of specific houses belonging to said plurality of houses, from another plurality of internet connected computers or a remote mobile devices, including in particular from a so-called smart phones or so-called wearable devices, and said web site enables displaying status and performance data, on said other plurality of internet connected computers, or remote mobile devices.

In some such embodiments said web site enables remote manipulation of the operation of any one of said control systems belonging to said plurality of houses, including changing the control target data, from said other plurality of internet connected computers or a remote mobile devices, including in particular from a so-called smart phones or so-called wearable devices Within the context of the disclosed invention, 'web site' shall be understood to also include any internet connected computer, or group of computers, including virtual machines or other dynamically assigned computers or computing resources depending on load conditions, addressable typically via IP address or URL, which can receive and send data by any protocols and on various ports, but such data may at least in part comprise data, which are in general not necessarily human readable, or the data may not necessarily be html or other formats interpretable by a regular internet browser to display human readable text or numbers (as would be the case for regular html based web sites).

In some embodiments said control systems from a plurality of buildings are at least temporarily connected to the internet and perform any one or any combination of the following services comprising: In some such embodiments said control systems from a plurality of buildings are at least temporarily connecting to a common web site, or to another internet connected computer at least partially acting as a server, and are transmitting any one or any combination of control system status data, and/or energy consumption data, and/or thermal budget data, and/or control system status performance data, and/or local solar radiation data, and/or local air temperature data, and/or local air speed data, and/or local air humidity data.

In some such embodiments said web site predominantly automatically analyzes said data received at least from some of said control systems belonging to said plurality of houses, and/or manipulates the operation of at least some of said control systems belonging to said plurality of houses, including changing control target data. In combination with above disclosed learning mode, said common web site or server may analyze environmental and performance data from several control systems to improve the average performance of said control systems, and by providing said control systems with updates of the required parameters, and/or reduced order models, and/or code, and/or algorithm.

In some embodiments said control system is at least temporarily connected to a mobile phone network and provides at least temporarily any one or any combination of the following services comprising: In some such embodiments said control system is sending status and performance data per sms. In some such embodiments said control system is enabling voice and/or touch-tone controlled remote log-ins, and/or providing spoken status and performance data via computer generated voice. In some such embodiments said control system is enabling voice and/or touch-tone controlled remote log-ins to manipulate via voice and/or touch-tone the operation of said control system, including to change control target data, and provides spoken feedback of such manipulations via computer generated voice.

Types of System Buses and Communication

In some embodiments the data communication between said at least one electronic controller, and at least some of said sensors and/or actuator (both of which themselves in some embodiments comprise electronic controllers, typically micro controllers) is at least in part based on wired standard and/or protocols as described in/by/under: 1-wire, ARCNET, BACnet, CAN, CANopen, C-Bus, DALI, DMX512, DOLLx8, Ethernet, EtherCAT, (or any other Ethernet based communications systems), FlexRay, GPIB, I²C, Insteon, Instabus, INTERBUS, KNX, LIN, LonTalk/LonWorks, OPC, OpenWebNet, Profibus, PSIS, S-Bus ("Smart-Bus"), SENT, SDI-12, SIOX, SMBus, SMI, RS-232, RS-485 (incl. "Advanced RS-485, or any other variant or successor", RS-422, SCADA, SafetyBUS, SERCOS, Sinec H1, USB, or other types of networks and field buses or future derived versions thereof, or other future comparable standards and/or protocols. In some embodiments existing power lines (typically 110V-230V) are at least in part used to transmit information between said at least one electronic controller and said sensors and/or actuators, including but not limited to X10, Universal Powerline Bus (UPB), EN 50090, European Home Systems Protocol (EHS), PLCBUS, or any future derived versions thereof, or other future comparable standards and/or protocols.

In some embodiment the data communication between said at least one electronic controller, and at least some of said sensors and/or actuator (both of which themselves in some embodiments comprise electronic controllers, typically micro controllers), and in some embodiments also at least in part (optionally) the required power supply thereof, is at least in part based on one or both of
   a) wireless standards and/or protocols, in particular any type of (relatively) low-rate wireless personal area network (LR-WPANs), and
   b) wireless standards and/or protocols covering low power wide area networks (LP-WAN)
including but not limited to those based on IEEE 805.15.1 (Bluetooth, incl. Bluetooth Low Energy), Wireless USB, IEEE 802.15.4, ITU-T G.9959, 6LoWPAN, ANT, ANT+, DASH7, EnOcean, Insteon, KNX-RF, LTE-Cat M, LoRaWan, MiWi, MiWi P2P, MyraNed, nWave, RPMA, SigFox, Thread (protocol), Weightless-W, Weightless-N, Weightless-P, WirelessHART, XMPP, ZigBee, Z-Wave, or any future derived versions thereof, or other future comparable standards and/or protocols.

In some such embodiments the data communication is established between said at least one electronic controller from multiple, proximally located buildings.

In some embodiment the data communication between said at least one electronic controller, and at least some of said sensors and/or actuator is at least in part based on wireless standards and/or protocols, in particular any type of medium or higher rate wireless personal area network, which in many instances may already be present in many buildings, including but not limited to those based all variants of IEEE 802.11 ("Wi-Fi"), IEEE 802.16m ("Wi-MAX"), and/or any other TCP/IP (IPv4 and/or IPv6) based local wireless networks, and/or any derived versions thereof, or other future comparable standards and/or protocols.

In some such embodiments the data communication is established between said at least one electronic controller from multiple, proximally located buildings.

In some embodiment the data communication between said at least one electronic controller, and at least some of said sensors and/or actuator is at least in part based on optical transport networks ("optical fibers"), including passive optical networks (PON), and related standard and/or protocols as described ITU-T G.709, G.798, G.872, G.983, G.984, G.987, as well as IEEE Ethernet PON, or future derived versions thereof, or other future comparable standards and/or protocols.

The increasing automation of homes, besides providing novel functionality and convenience, poses also increased security risks by enabling (unintended) access to vital functions of a building as well as underlying data, including the possibility of manipulating or otherwise exploiting the same. Thus, in particular, in some embodiment the data communication between said electronic controller, and at least some of said sensors and or actuator does incorporate various means to protect the communication from eavesdropping and/or manipulation by external attackers by various means, including but not limited to encryption and authentication mechanisms. (Or at least make such attacks more difficult and/or expensive.)

There are Several Preferable Embodiments with Respect to the Material from which Said Walls 201 and 204 are Made.

Wall shall be understood to mean any physical means for enclosure since not in all cases and design a distinction between a roof and a wall may be possible.

In some embodiments said walls comprise masonry (incl. but not limited to bricks and tiles).

In some embodiments said walls comprise concrete.

In some embodiments said walls comprise cementitious material.

In some embodiments said walls comprise metal.

In some embodiments said walls comprise wood.

In some embodiments said walls comprise wood and some material predominantly serving as thermal insulation.

In some embodiments said walls comprise plastic.

In some embodiments said walls comprise a fiber-reinforced polymer.

In some embodiments said walls comprise glass.

In some embodiments said walls comprise metal and glass.

In some embodiments said walls comprise at least in part a material, which undergoes at least in part at least one phase change of its molecular structure at a temperature which is between the minimum and maximum operating temperature.

In some embodiments nano- and micro-particles from populations with predominantly distinct size distributions, shape distributions, chemical compositions, crystal structures, and crystallinity distributions are added to materials or constitute materials, from which walls 201 and/or 204 are made, and any one or any combination of effective volumetric heat capacity, latent heat, and heat conductivity of said thermal carrier liquid is modified compared to base properties of the pure materials.

There are Several Preferable Embodiments with Respect Additional Elements and Coatings on at Least Parts of the Outside of Said Building.

In some embodiments at least some of the outside facing surfaces of said building may be made from materials or have at least partially coating made from material, which at least in part are based on tailored mixes of nano- and micro particles (and/or cavities). In some embodiments at least some of the outside facing parts of the envelope of said building, and or associated surfaces, may be made from materials or have at least partially coating made from materials, which at least in part are based on tailored mixes of nano- and micro particles (and/or cavities).

In some embodiments at least some of the outside facing parts of the envelope of said building, and or associated surfaces, may have certain (non-black and non-white) colors or patterns in the VIS range and very high NIR reflectivity. Such reflective properties may be achieved by using coatings or bulk materials, which are at least in part are based on tailored mixes of nano- and micro particles (and/or cavities) to approximate a desired spectral reflectivity.

In some embodiments at least some of the outside facing parts of the envelope of said building, and or associated surfaces, typically at least those facing south, may have broadband super-reflective properties at least in the VIS and NIR wavelength range, either due to applying additional layers or by using bulk materials, which are at least in part based on the use of tailored mixtures of populations of nano- and/or micro particles and/or cavities with distinct properties per population.

In some embodiments the amount absorbed energy as a result exposure to directionally and temporarily varying levels of solar irradiance can be modulated by placing in the relative proximity of at least parts of said building a plurality of spatially adjustable functional elements, which an be used to chance the portion of incident solar irradiance, which reaches outside facing surfaces of sid building, in particular the surfaces of said walls 201 and 204. At least those areas are preferably covered, which are predominantly directly exposed to said solar radiation.

Spatially adjustable, or a spatial degree of freedom, shall mean that said plurality of functional elements are mounted such that there is at least one translational or rotational degree of freedom. In some embodiments this may be a single rotational degree of freedom around a horizontal or vertical axis, such as for example the hinge-like element. In some embodiments there may be two rotational degrees of freedom whereas in other embodiments there may be one rotational and one translational degree of freedom. In yet some other embodiments said functional elements may also be able to change their shape.

In some embodiments said functional elements can be metallic, ceramic (incl. glass, clay, minerals, or concrete), or plastic (or other polymer based synthetic materials), and/or multi-layered composites of such materials. Said elements have generally one spatial dimension with is significantly smaller than the two others. The placement of said functional elements is such that thermally conductive bridges to the inner shell via direct contact are relatively small or effectively negligible.

In some embodiments said functional elements can be at least in part made from bulk materials or at least partially coated with materials, which are at least in part are based on tailored mixes of nano- and micro particles (and/or cavities) to approximate a desired spectral reflectivity in any one or any combination of the UV, VIS, and IR wavelength range.

In some embodiments existing buildings such as single family homes, apartment buildings, or any other existing buildings, are retrofitted with one or any combination of elements of the disclosed invention.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. A method of controlling air flow for a building, comprising:
providing a control system, the control system comprising a computational model of a thermal behavior of a building, wherein the computational model comprises at least one of:
a reduced order model; and
a simplified discrete numerical model;
receiving an input of a desired system target into the control system, wherein the desired system target comprises at least one of:
a reduced average energy expenditure for keeping at least one primary compartment of a building within a desired temperature range by means of active air conditioning;
a reduced temperature variation during a typical 24-hour cycle within said at least one primary compartment of a building;
a reduced average temperature of said at least one primary compartment of a building; and
a reduced peak temperature of said at least one primary compartment of a building;
receiving an electronic signal into the control system from at least one sensor; and
modulating air flow to and from the secondary compartment to approximate the desired system target, based upon the model, the input, and the electronic signal.

2. The method according to claim 1, further comprising:
storing data with the control system, wherein the data comprises one or more of:
past signals from at least one of said sensors; and
past data corresponding to a system control performance; and
using the data to at least approximate one or more of:
changing parameters of;
changing a logic structure of; and
improving a prediction accuracy of
the computational model, and based thereon improving at least on average system control performance.

3. The method according to claim 2 further comprising:
connecting said control system to one or more of the internet and a wireless cellular network; and
performing one or more of the following with the control system:
exchanging data with other computers connected to said networks;
sending status and performance data;
receiving one or both of control data and other performance supporting data;
enabling remote log-ins to display status and performance data on a remote computer or a remote mobile device;
enabling remote log-ins to manipulate operation of said control system, including to change control target data from a remote computer or remote mobile devices;
enabling data exchange with and remote control of said control system from mobile devices at least in part based on sending and receiving one or both of sms and email;
enabling one or more of voice or touch-tone controlled remote log-ins to manipulate via one or more of voice or touch-tone operation of said control system, including to change control target data; and
providing spoken feedback of said manipulations via computer generated voice.

4. The method according to claim 3 further comprising:
connecting a plurality of the control systems corresponding with a plurality of buildings to the internet, and further comprising one or more of:
connecting to at least one common internet connected computer and transmitting one or more of status and performance data;
connecting to at least one common internet connected computer and enabling user log-ins to said control systems of specific houses belonging to said plurality of houses, from another plurality of internet connected computers or remote mobile devices;
connecting to at least one common internet connected computer to enable status and performance data to be displayed on said other plurality of internet connected computers or remote mobile devices; and
connecting to at least one common internet connected computer to enable remote manipulation of operation of at least one of said control systems belonging to said plurality of houses, including changing control target data, from said other plurality of internet connected computers or remote mobile devices.

5. The method according to claim 3 further comprising:
connecting a plurality of the control systems corresponding with a plurality of buildings to the internet, and further comprising one or more of:
connecting to at least one common internet connected computer and transmitting one or more of:
control system status data;
energy consumption data;
thermal budget data;
control system status performance data;
local solar radiation data;
local air temperature data; and
local air humidity data; and
automatically performing, at least partially with the at least one common internet connected computer, one or more of:
analyzing data received from at least some of said control systems corresponding with said plurality of houses; and
manipulating operation of at least some of said control systems corresponding with said plurality of houses, including changing control target data.

6. The method according to claim 3 further comprising:
electronically receiving weather forecast data with said at least one control system, wherein the data are used at least in part for one or more of:
calculating estimates of expected future changes to an energy budget of said building;
changing parameters of the model used in said control system;
changing the model type used in said control system;
at least on average enhancing predictive performance of said model used in said control system; and
at least on average enhancing performance of said control system.

7. The method according to claim 3 further comprising:
electronically receiving data to at least a first of said control systems of a first building, the data originating from other control systems corresponding with a plurality of other buildings, wherein the plurality of other buildings are predominantly in at least one of:

a same area as the first building and
a same type of building with respect to each other,
wherein said received data comprises any one or more of:
control system status data;
control system model type;
control system model parameters;
control system performance data;
energy consumption data;
thermal budget data;
local solar radiation data;
local air temperature data; and
local air humidity data; and
using such received data for one or more of:
calculating estimates of expected future changes to an energy budget of said first building;
changing parameters of the computational model used in said first control system;
changing the computational model type used in said first control system;
at least on average enhancing predictive performance of said computational model used in said first control system; and
at least on average enhancing performance of said first control system.

8. The method according to claim 3, wherein the at least one sensor comprises at least one sensor in the group consisting of:
at least one sensor to provide electronic signals representing solar radiation levels;
at least one sensor to provide electronic signals representing ambient air temperature levels; and
at least one sensor to provide electronic signals representing air temperature in said at least one secondary compartment.

9. The method according to claim 3, wherein modulating comprises one or more of:
modulating the throughput of passive air flow to and from said at least secondary compartment;
modulating the average speed of passive air flow to and from said at least secondary compartment;
modulating the throughput of actively driven air flow to and from said at least secondary compartment; and
modulating the average speed of actively driven air flow to and from said at least secondary compartment.

10. The method according to claim 2 further comprising:
connecting a plurality of the control systems corresponding with a plurality of buildings to the internet, and further comprising one or more of:
connecting to at least one common internet connected computer and transmitting one or more of status and performance data;
connecting to at least one common internet connected computer and enabling user log-ins to said control systems of specific houses belonging to said plurality of houses, from another plurality of internet connected computers or remote mobile devices;
connecting to at least one common internet connected computer to enable status and performance data to be displayed on said other plurality of internet connected computers or remote mobile devices; and
connecting to at least one common internet connected computer to enable remote manipulation of operation of at least one of said control systems belonging to said plurality of houses, including changing control target data, from said other plurality of internet connected computers or remote mobile devices.

11. The method according to claim 2 further comprising:
connecting a plurality of the control systems corresponding with a plurality of buildings to the internet, and further comprising one or more of:
connecting to at least one common internet connected computer and transmitting one or more of:
control system status data;
energy consumption data;
thermal budget data;
control system status performance data;
local solar radiation data;
local air temperature data; and
local air humidity data; and
automatically performing, at least partially with the at least one common internet connected computer, one or more of:
analyzing data received from at least some of said control systems corresponding with said plurality of houses; and
manipulating operation of at least some of said control systems corresponding with said plurality of houses, including changing control target data.

12. The method according to claim 2 further comprising:
electronically receiving weather forecast data with said at least one control system, wherein the data are used at least in part for one or more of:
calculating estimates of expected future changes to an energy budget of said building;
changing parameters of the model used in said control system;
changing the model type used in said control system;
at least on average enhancing predictive performance of said model used in said control system; and
at least on average enhancing performance of said control system.

13. The method according to claim 2 further comprising:
electronically receiving data to at least a first of said control systems of a first building, the data originating from other control systems corresponding with a plurality of other buildings, wherein the plurality of other buildings are predominantly in at least one of:
a same area as the first building and
a same type of building with respect to each other,
wherein said received data comprises any one or more of:
control system status data;
control system model type;
control system model parameters;
control system performance data;
energy consumption data;
thermal budget data;
local solar radiation data;
local air temperature data; and
local air humidity data; and
using such received data for one or more of:
calculating estimates of expected future changes to an energy budget of said first building;
changing parameters of the computational model used in said first control system;
changing the computational model type used in said first control system;
at least on average enhancing predictive performance of said computational model used in said first control system; and
at least on average enhancing performance of said first control system.

14. The method according to claim 2, wherein the at least one sensor comprises at least one sensor in the group consisting of:

at least one sensor to provide electronic signals representing solar radiation levels;
at least one sensor to provide electronic signals representing ambient air temperature levels; and
at least one sensor to provide electronic signals representing air temperature in said at least one secondary compartment.

15. The method according to claim 2, wherein modulating comprises one or more of:
modulating the throughput of passive air flow to and from said at least secondary compartment;
modulating the average speed of passive air flow to and from said at least secondary compartment;
modulating the throughput of actively driven air flow to and from said at least secondary compartment; and
modulating the average speed of actively driven air flow to and from said at least secondary compartment.

16. The method according to claim 1, further comprising:
connecting said control system to one or more of the internet and a wireless cellular network; and
performing one or more of the following with the control system:
exchanging data with other computers connected to said networks;
sending status and performance data;
receiving one or both of control data and other performance supporting data;
enabling remote log-ins to display status and performance data on a remote computer or a remote mobile device;
enabling remote log-ins to manipulate operation of said control system, including to change control target data from a remote computer or remote mobile devices;
enabling data exchange with and remote control of said control system from mobile devices at least in part based on sending and receiving one or both of sms and email;
enabling one or more of voice or touch-tone controlled remote log-ins to manipulate via one or more of voice or touch-tone operation of said control system, including to change control target data; and
providing spoken feedback of said manipulations via computer generated voice.

17. The method according to claim 16 further comprising:
connecting a plurality of the control systems corresponding with a plurality of buildings to the internet, and further comprising one or more of:
connecting to at least one common internet connected computer and transmitting one or more of status and performance data;
connecting to at least one common internet connected computer and enabling user log-ins to said control systems of specific houses belonging to said plurality of houses, from another plurality of internet connected computers or remote mobile devices;
connecting to at least one common internet connected computer to enable status and performance data to be displayed on said other plurality of internet connected computers or remote mobile devices; and
connecting to at least one common internet connected computer to enable remote manipulation of operation of at least one of said control systems belonging to said plurality of houses, including changing control target data, from said other plurality of internet connected computers or remote mobile devices.

18. The method according to claim 16 further comprising:
connecting a plurality of the control systems corresponding with a plurality of buildings to the internet, and further comprising one or more of:
connecting to at least one common internet connected computer and transmitting one or more of:
control system status data;
energy consumption data;
thermal budget data;
control system status performance data;
local solar radiation data;
local air temperature data; and
local air humidity data; and
automatically performing, at least partially with the at least one common internet connected computer, one or more of:
analyzing data received from at least some of said control systems corresponding with said plurality of houses; and
manipulating operation of at least some of said control systems corresponding with said plurality of houses, including changing control target data.

19. The method according to claim 16 further comprising:
electronically receiving weather forecast data with said at least one control system, wherein the data are used at least in part for one or more of:
calculating estimates of expected future changes to an energy budget of said building;
changing parameters of the model used in said control system;
changing the model type used in said control system;
at least on average enhancing predictive performance of said model used in said control system; and
at least on average enhancing performance of said control system.

20. The method according to claim 16 further comprising:
electronically receiving data to at least a first of said control systems of a first building, the data originating from other control systems corresponding with a plurality of other buildings, wherein the plurality of other buildings are predominantly in at least one of:
a same area as the first building and
a same type of building with respect to each other,
wherein said received data comprises any one or more of:
control system status data;
control system model type;
control system model parameters;
control system performance data;
energy consumption data;
thermal budget data;
local solar radiation data;
local air temperature data; and
local air humidity data; and
using such received data for one or more of:
calculating estimates of expected future changes to an energy budget of said first building;
changing parameters of the computational model used in said first control system;
changing the computational model type used in said first control system;
at least on average enhancing predictive performance of said computational model used in said first control system; and
at least on average enhancing performance of said first control system.

21. The method according to claim 16, wherein the at least one sensor comprises at least one sensor in the group consisting of:

at least one sensor to provide electronic signals representing solar radiation levels;
at least one sensor to provide electronic signals representing ambient air temperature levels; and
at least one sensor to provide electronic signals representing air temperature in said at least one secondary compartment.

22. The method according to claim 16, wherein modulating comprises one or more of:
modulating the throughput of passive air flow to and from said at least secondary compartment;
modulating the average speed of passive air flow to and from said at least secondary compartment;
modulating the throughput of actively driven air flow to and from said at least secondary compartment; and
modulating the average speed of actively driven air flow to and from said at least secondary compartment.

23. The method according to claim 1 further comprising:
connecting a plurality of the control systems corresponding with a plurality of buildings to the internet, and further comprising one or more of:
connecting to at least one common internet connected computer and transmitting one or more of status and performance data;
connecting to at least one common internet connected computer and enabling user log-ins to said control systems of specific houses belonging to said plurality of houses, from another plurality of internet connected computers or remote mobile devices;
connecting to at least one common internet connected computer to enable status and performance data to be displayed on said other plurality of internet connected computers or remote mobile devices; and
connecting to at least one common internet connected computer to enable remote manipulation of operation of at least one of said control systems belonging to said plurality of houses, including changing control target data, from said other plurality of internet connected computers or remote mobile devices.

24. The method according to claim 1 further comprising:
connecting a plurality of the control systems corresponding with a plurality of buildings to the internet, and further comprising one or more of:
connecting to at least one common internet connected computer and transmitting one or more of:
control system status data;
energy consumption data;
thermal budget data;
control system status performance data;
local solar radiation data;
local air temperature data; and
local air humidity data; and
automatically performing, at least partially with the at least one common internet connected computer, one or more of:
analyzing data received from at least some of said control systems corresponding with said plurality of houses; and
manipulating operation of at least some of said control systems corresponding with said plurality of houses, including changing control target data.

25. The method according to claim 1 further comprising:
electronically receiving weather forecast data with said at least one control system, wherein the data are used at least in part for one or more of:
calculating estimates of expected future changes to an energy budget of said building;
changing parameters of the model used in said control system;
changing the model type used in said control system;
at least on average enhancing predictive performance of said model used in said control system; and
at least on average enhancing performance of said control system.

26. The method according to claim 1 further comprising:
electronically receiving data to at least a first of said control systems of a first building, the data originating from other control systems corresponding with a plurality of other buildings, wherein the plurality of other buildings are predominantly in at least one of:
a same area as the first building and
a same type of building with respect to each other,
wherein said received data comprises any one or more of:
control system status data;
control system model type;
control system model parameters;
control system performance data;
energy consumption data;
thermal budget data;
local solar radiation data;
local air temperature data; and
local air humidity data; and
using such received data for one or more of:
calculating estimates of expected future changes to an energy budget of said first building;
changing parameters of the computational model used in said first control system;
changing the computational model type used in said first control system;
at least on average enhancing predictive performance of said computational model used in said first control system; and
at least on average enhancing performance of said first control system.

27. The method according to claim 1, wherein the at least one sensor comprises at least one sensor in the group consisting of:
at least one sensor to provide electronic signals representing solar radiation levels;
at least one sensor to provide electronic signals representing ambient air temperature levels; and
at least one sensor to provide electronic signals representing air temperature in said at least one secondary compartment.

28. The method according to claim 1, wherein the at least one sensor comprises:
at least one sensor to provide electronic signals representing solar radiation levels;
at least one sensor to provide electronic signals representing ambient air temperature levels; and
at least one sensor to provide electronic signals representing air temperature in said at least one secondary compartment.

29. The method according to claim 1, wherein modulating comprises one or more of:
modulating the throughput of passive air flow to and from said at least secondary compartment;
modulating the average speed of passive air flow to and from said at least secondary compartment;
modulating the throughput of actively driven air flow to and from said at least secondary compartment; and
modulating the average speed of actively driven air flow to and from said at least secondary compartment.

30. The method according to claim 1 wherein said at least one secondary compartment comprises a wall comprising at least one material that undergoes at least one phase change of its molecular structure at a temperature which is between a minimum and maximum operating temperature within said secondary compartment.

31. The method according to any one of claims 2, 16, 3, 23, 24, 25, 26 and 1 wherein said at least one secondary compartment comprises at least one material that undergoes at least one phase change of its molecular structure at a temperature which is between a minimum and maximum operating temperature within said secondary compartment.

32. The method according to any one of claims 2, 16, 3, 23, 24, 25, 26 and 1 wherein at least some outside facing parts of the envelope of said building comprise materials, the materials comprising at least some tailored mixes of nano- and micro particles cavities.

33. The method according to any one of claims 2, 16, 3, 23, 24, 25, 26 and 1, wherein at least some outside facing surfaces of said building comprise materials, the materials comprising at least some tailored mixes of nano- and micro particles and/or cavities, and which have certain non-black and non-white colors or patterns in a Visible (VIS) wavelength range and very high Near Infrared (NIR) reflectivity.

* * * * *

UNITED STATES PATENT AND TRADEMARK OFFICE
CERTIFICATE OF CORRECTION

PATENT NO. : 10,533,767 B2
APPLICATION NO. : 15/449704
DATED : January 14, 2020
INVENTOR(S) : Andreas Hieke et al.

Page 1 of 3

It is certified that error appears in the above-identified patent and that said Letters Patent is hereby corrected as shown below:

In the Specification

In Column 1, Line 39, delete "$CO_2$)" and insert --$CO_2$).--.

In Column 2, Line 52, delete "On" and insert --One--.

In Column 4, Line 38, delete "mm)" and insert --mm--.

In Column 5, Line 17, delete "ratio")" and insert --ratio").--.

In Column 9, Line 25, delete "see" and insert --sea--.

In Column 10, Line 63, delete "etc.)" and insert --etc.--.

In Column 14, Line 39, delete "enabeling" and insert --enabling--.

In Column 15, Line 31, delete "(balancing" and insert --balancing--.

In Column 16, Line 41, delete "an a" and insert --a--.

In Column 17, Line 65, delete "in on" and insert --on--.

In Column 19, Line 2, delete "LIVID S" and insert --LMDS--.

In Column 19, Line 17, delete "compartments" and insert --compartments.--.

In Column 19, Line 53, delete "posses" and insert --possess--.

In Column 20, Line 44, delete "from" and insert --form--.

Signed and Sealed this
Eighth Day of September, 2020

Andrei Iancu
*Director of the United States Patent and Trademark Office*

CERTIFICATE OF CORRECTION (continued)
U.S. Pat. No. 10,533,767 B2

In Column 20, Line 67, delete "$T^{-1})^{-1}d\lambda$" and insert --$T^{-1})$-1$)^{-1} d\lambda$--.

In Column 21, Line 62, delete "(1-α)" and insert --(1-α).--.

In Column 23, Line 14, delete "t)" and insert --t).--.

In Column 23, Line 39, delete "know" and insert --known--.

In Column 24, Line 50, delete "enabeling" and insert --enabling--.

In Column 26, Line 11, delete "and or" and insert --and/or--.

In Column 26, Line 54, delete "there" and insert --their--.

In Column 27, Line 24, delete "know" and insert --known--.

In Column 28, Line 25, delete "in on" and insert --on--.

In Column 28, Line 56, delete "and or" and insert --and/or--.

In Column 29, Line 53, delete "Ardunio" and insert --Arduino--.

In Column 30, Line 22, delete "form" and insert --from--.

In Column 31, Line 10, delete "devices" and insert --devices.--.

In Column 32, Line 6, delete "PSIS" and insert --PSI5--.

In Column 32, Line 8, delete "(incl." and insert --incl.--.

In Column 33, Line 8, delete "and or" and insert --and/or--.

In Column 33, Line 56, delete "and or" and insert --and/or--.

In Column 33, Line 61, delete "and or" and insert --and/or--.

In Column 34, Line 2, delete "and or" and insert --and/or--.

In Column 34, Line 14, delete "an" and insert --can--.

In Column 34, Line 16, delete "sid" and insert --said--.

CERTIFICATE OF CORRECTION (continued)
U.S. Pat. No. 10,533,767 B2

In the Claims

In Column 35, Line 30, Claim 1, delete "the" and insert --and--.

In Column 43, Line 17, Claim 32, delete "particles cavities." and insert --particles and/or cavities.--.